United States Patent [19]
Brown

[11] 3,780,577
[45] Dec. 25, 1973

[54] ULTRASONIC FLUID SPEED OF SOUND AND FLOW METER APPARATUS AND METHOD

[75] Inventor: Alvin E. Brown, Redwood, Calif.

[73] Assignee: Saratoga Systems, Inc., Cupertino, Calif.

[22] Filed: July 3, 1972

[21] Appl. No.: 268,712

[52] U.S. Cl. .............................................. 73/194 A
[51] Int. Cl. ............................ G01f 1/00, G01p 5/00
[58] Field of Search ................................. 73/194 A

[56] References Cited
UNITED STATES PATENTS

| | | | |
|---|---|---|---|
| 2,826,912 | 3/1958 | Kritz | 73/194 A |
| 2,921,467 | 1/1960 | Hedrich et al. | 73/194 A |
| 3,050,997 | 8/1962 | Lake | 73/194 A |
| 3,420,102 | 1/1969 | Brown | 73/194 A |

FOREIGN PATENTS OR APPLICATIONS

| 191,155 | 7/1967 | U.S.S.R. | 73/194 A |
|---|---|---|---|

Primary Examiner—Charles A. Ruehl
Attorney—Paul D. Flehr et al.

[57] ABSTRACT

An ultrasonic speed of sound and flow metering system which may utilize only one pair of ultrasonic transducers by incorporating a unique time share feature. In one embodiment a direct synthesis of a frequency proportional to the speed of sound in a flowing medium is obtained using one voltage controlled oscillator. An additional direct synthesis of a data frequency proportional to the flow of the medium is derived from signals inversely proportional to sound energy transit times upstream and downstream.

21 Claims, 16 Drawing Figures

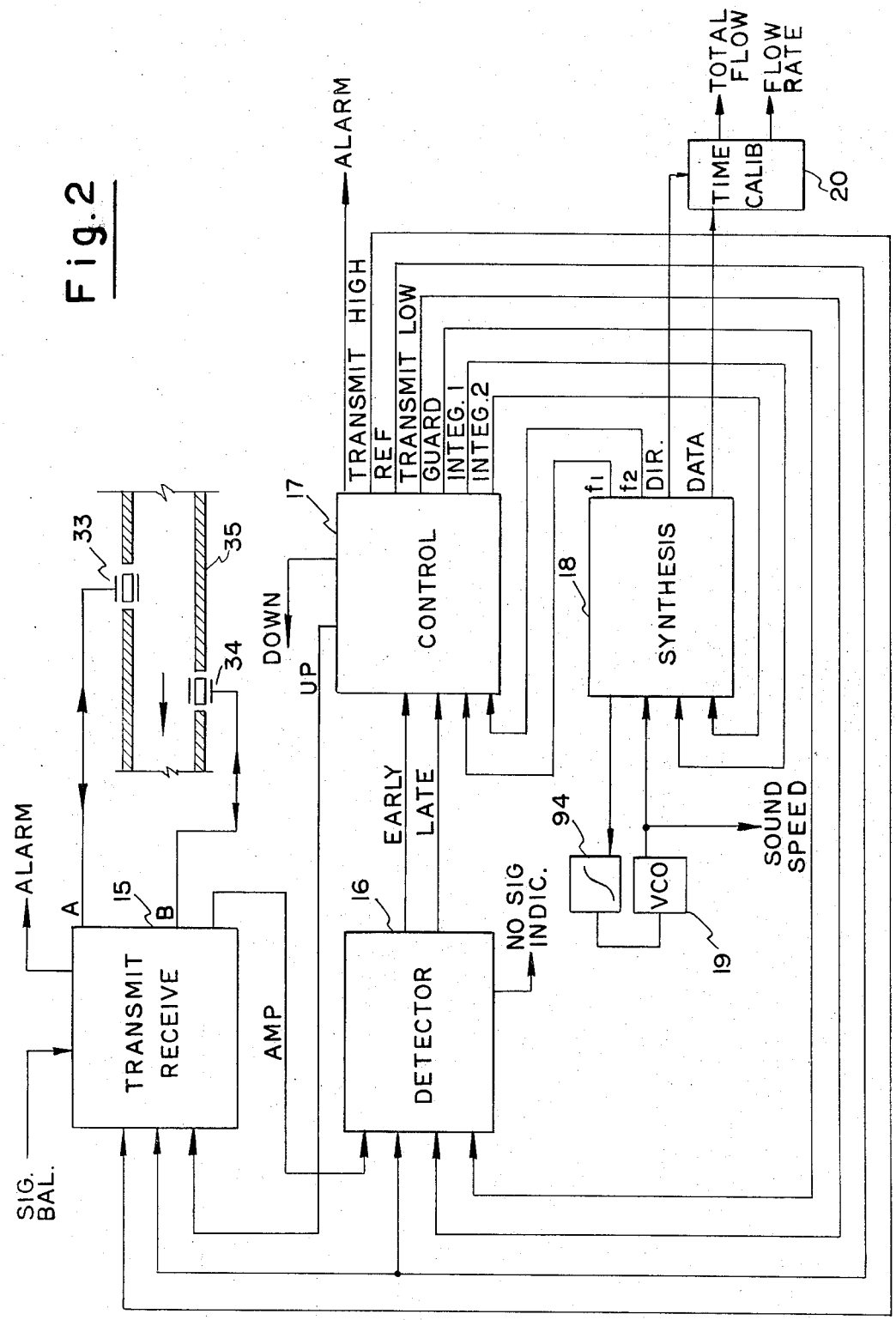

ULTRASONIC FLUID SPEED OF SOUND AND FLOW METER APPARATUS AND METHOD

BACKGROUND OF THE INVENTION

The present invention is directed toward a fluid metering system and more particularly to a system which provides data indicative of the speed of sound energy propagation through the flowing medium as well as the flow characteristics of the medium.

Systems utilizing ultrasonic transducers in communication with a flowing medium are old in the art. Many systems have been disclosed which measure flow velocity, sound propagation velocity or both. Generally these systems require a voltage controlled oscillator for each direction of transmission through the flowing medium to provide an upstream and downstream frequency proportional to the speed of sound. Some systems employ switching means whereby one VCO may be made to serve for transmission in two directions. Other systems impose a quadrature between the received signal and the transmitted signal and control the output of a VCO through a phase detector. Other methods use the flowing medium as the frequency determinative element in an oscillating or "ring around" system.

Problems commonly arising in the foregoing types of metering systems relate to the loss of low flow rate information when using two oscillators, or the requirement for more than one pair of transducers when seeking to transmit upstream and down-stream, or the necessity for unwieldy switching means, or any combination of these.

OBJECTS OF THE INVENTION AND SUMMARY

It is an object of the present invention to provide a measure of the velocity of sound propagation through a fluid medium as well as a measure of flow.

It is another object of the present invention to provide a sound speed and flow metering system which utilizes a minimum number of transducers.

It is another object of the present invention to provide a sound speed and fluid flow metering system which in one embodiment synthesizes the sound speed and flow proportional frequencies without using VCO's to provide frequencies inversely proportional to upstream and downstream transmission times.

It is another object of the present invention to provide a sound speed and fluid flow metering system which provides a continuous direction of flow indication.

It is another object of the present invention to provide a sound speed and fluid flow metering system which may be utilized for any flowing medium or pipe or channel size by maintaining a constant phase relationship between all control and data signals.

It is another object of the present invention to provide a sound speed and fluid flow metering system with fine resolution of measurement down to zero flow.

It is another object of the present invention to provide a sound speed and fluid flow metering system which is bi-directional.

It is another object of the present invention to provide a sound speed and fluid flow metering system with a time calibrated output providing total flow and or flow rate.

It is another object of the present invention to provide a sound speed and fluid flow metering system with an accuracy uninhibited by interference from echoes within the flowing medium caused by prior transmitted pulses.

The foregoing and other objects of the invention are achieved in an ultrasonic speed of sound and flow metering system for use in monitoring flow velocity and volume and speed of sound energy propagation through fluids conveyed in closed conduits or open channels. The system includes means for generating signals which are transmitted alternately in generally upstream and downstream directions through the fluid and means for receiving the signals so transmitted. Means are provided for shaping the received signal and for generating a reference signal which is used for phase comparison with the shaped received signal. Signal levels responsive to the phase relation and proportional to upstream and downstream sound speeds are generated. The proportional signal levels are used to generate frequencies proportional to upstream and downstream sound speeds. Control means are provided which are responsive to the upstream and downstream frequencies to direct the alternating transmit/receive feature. Means are provided to combine the upstream and downstream frequencies to obtain sum and difference frequencies which are indicative of fluid sound propagation speed and flow respectively.

BRIEF DESCRIPTION OF DRAWINGS

FIG. 2 is a detailed block diagram of the system including frequency synthesis.

DESCRIPTION OF THE PREFERRED EMBODIMENT

Figure 1:
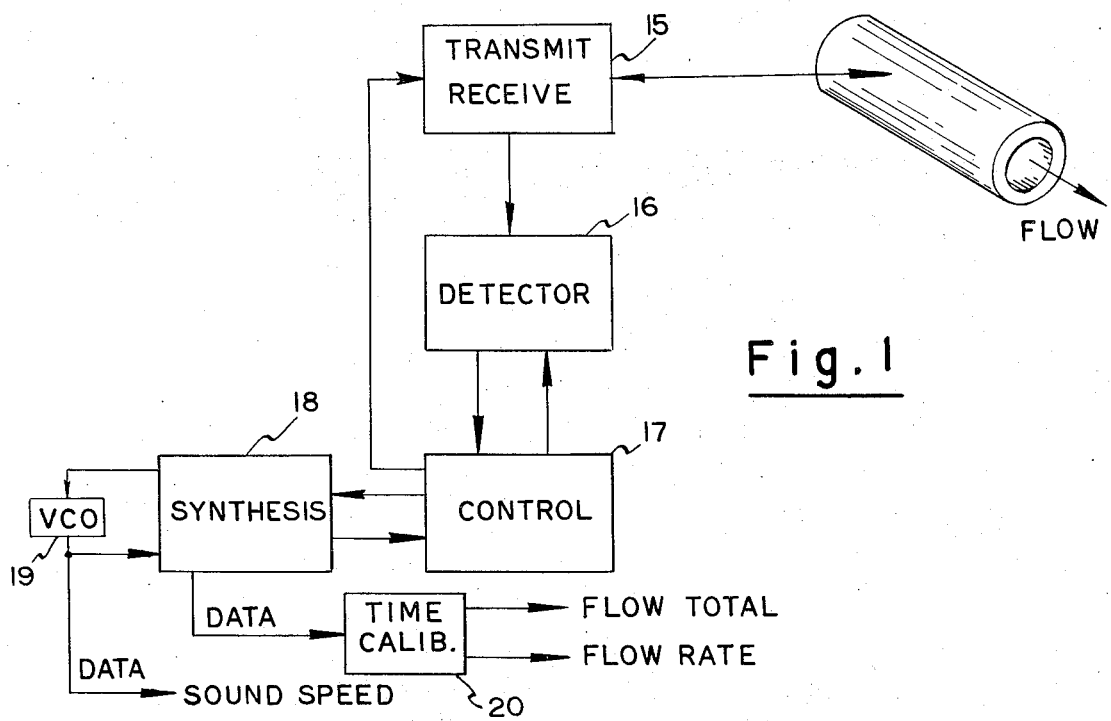
FIG. 1 is a simplified block diagram of the system.

The invention described here is a fluid flow metering system which also provides indication of the speed of sound through the flowing medium. The system includes at least one pair of ultrasonic piezoelectric transducers mounted in communication with the flowing medium to be measured. One embodiment provides for direct synthesis of a data frequency proportional to the flow of the medium and of a frequency proportional to the speed of sound in the medium from a single voltage controlled oscillator. The synthesized signals are derived from signals proportional to sound energy transit times through the fluid in generally upstream and downstream directions. The data frequency and oscillator frequency are combined using standard upper and lower side band separation techniques, balanced modulators, and linear frequency mixers. The results are frequencies proportional to upstream and downstream sound speeds through the medium which are used to control transmission direction, selection of the proper transducer for reception, and synthesis of the sound speed and flow data frequencies. As can be seen in FIG. 1 the system includes a transmit/receive network 15 wherein the switch selections are made which provide for alternate functioning of the transducers as transmitter and receiver and receiver and transmitter respectively. The received signal is delivered from the transmit/receive network 15 to a detector network 16. The detector network 16 shapes the received pulse in a manner disclosed in copending U.S. Pat. application Ser. No. 250,760. A control network 17 generates a reference pulse which is directed to the detector network 16. A phase comparison between the received pulse and the reference pulse is performed in the detector network 16 and a signal with its polarity determined by the relative early or late nature of the received pulse is directed to the control network 17. The control network 17 performs summations of the early/late signals which are delivered to a frequency synthesizing network 18. The synthesizing network 18 operating on the summations provides frequencies which are proportional to the upstream and downstream sound propagation velocities. These frequencies are directed to control network 17 to provide control signals which properly sequence the transmit/receive switching performed in the transmit/receive network 15. The control signals from control network 17 are also connected to detector network 16 providing proper signal sequence for the received signal and reference signal phase comparison, a receiver amplifier automatic gain control, and a "no signal" indication alarm. The summations of the early/late signals from control network 17 are utilized directly within the frequency synthesizing network 18 to control the output frequency of a voltage controlled oscillator 19 and to generate a data frequency. The output of VCO 19 provides a frequency proportional to the speed of sound through the flowing medium. The data frequency is proportional to flow. A time calibration circuit 20 receives the data frequency converting it to totalized flow or flow rate as desired on visual indicators responsive to the output from the time calibration circuit 20.

Figure 3:
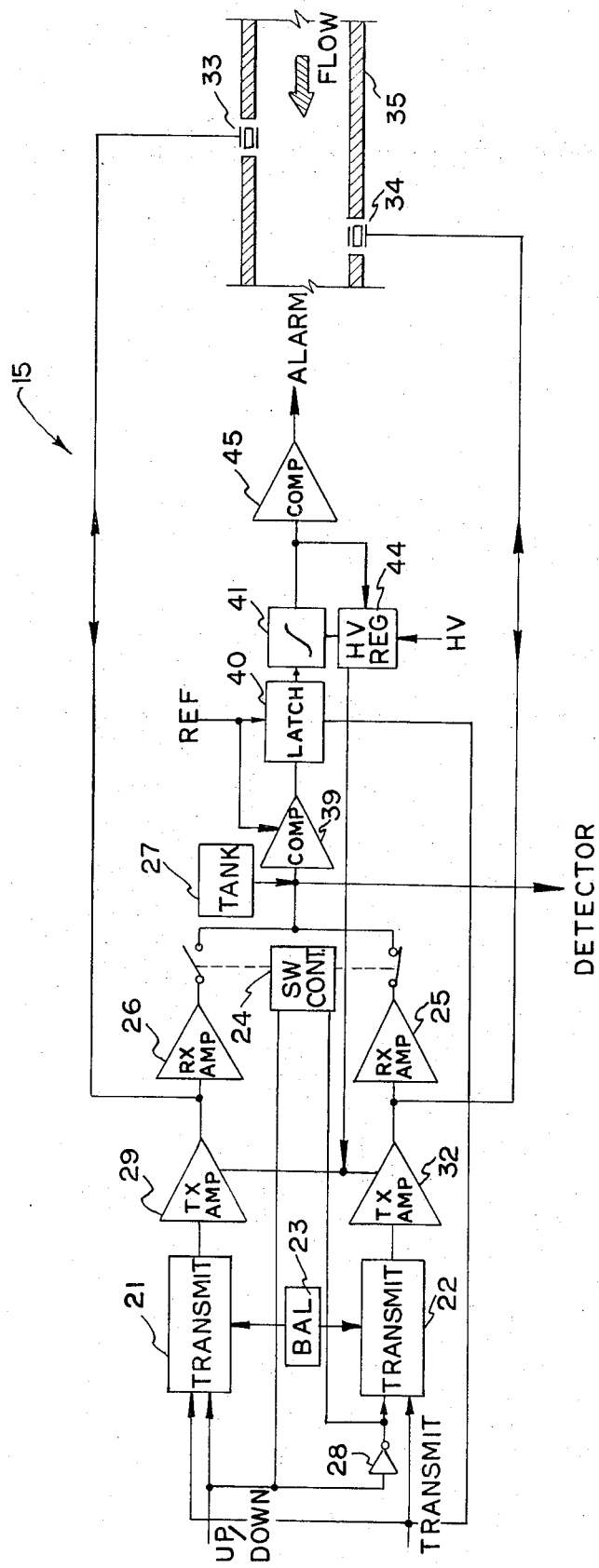
FIG. 3 is a block diagram of the transmit receive section of the system.

Referring now to FIG. 3 the transmit/receive section 15 of the system is shown in block form. This section of the circuit directs a transmission pulse to an appropriate transducer and channels the received signal from the other transducer to an appropriate amplifier. An up/down input from the control circuit 17 is used to generate a pulse from either one shot device 21 or 22. Balance potentiometer 23 is connected to both transmit pulse generators 21 and 22 to provide uniform transmit pulse width. The same up/down signal selects the position of the analog switch 24 which in turn alternately connects first or second receiver amplifier 25 or 26 to the received signal conditioning network in the detector 16. Tank circuit 27 is provided to boost the received signal from receivers 25 or 26 prior to directing it to the detector circuit 16. Inverter 28 provides the "down" signal since only the "up" signal from control 17 is connected to the transmit/receive circuit 15. The transmit pulse generators 21 and 22 are connected to the input of high voltage transmit pulse amplifiers 29 and 32 respectively. Transmitter amplifier 29 can be seen to be connected to transducer 33 and transmitter amplifier 32 can be seen to be connected to transducer 34 in the wall of pipe 35.

Voltage comparator 39 is also alternately connected to the output of receiver amplifier 25 or 26 and directs an output to a high-low signal latch circuit 40 which also receives a positive transmit signal from control section 17. An integrator 41 receives the output of latch 40 and drives high voltage regulator 44 to meet the amplitude requirements set for the received signal at the comparator 39. The output of integrator 41 is also delivered to a comparator 45 which provides an alarm indication for a predetermined transmit pulse high voltage level which indicates a low received pulse level and probable malfunction.

Figure 5:
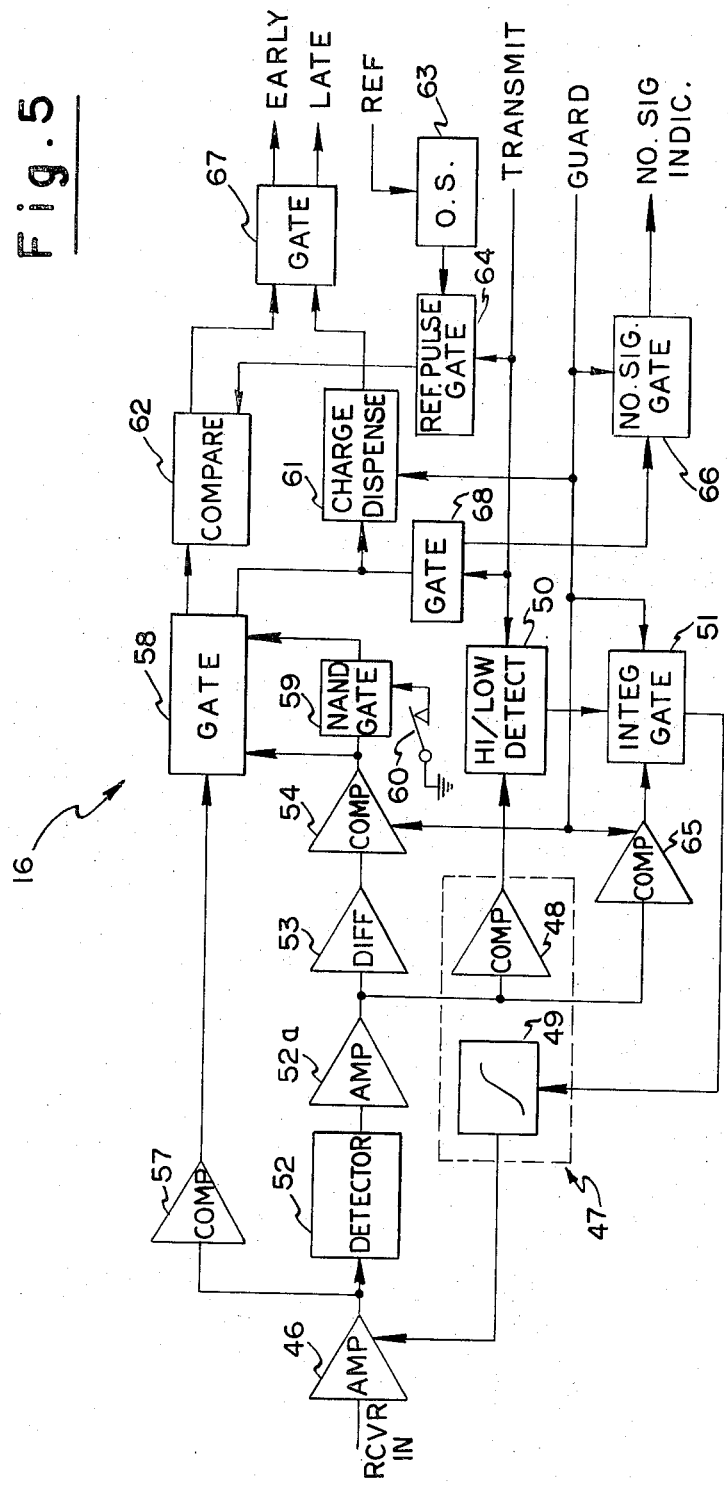
FIG. 5 is a block diagram of the detector section of the system.

Turning now to FIG. 5 a block diagram of the detector section 16 of the system is seen. This section of the circuitry receives the signal transmitted through the flowing medium, conditions it, and makes an early or late reception decision for the received pulse when compared with a reference. Amplifier 46 receives the signal passed on from first or second receiver amplifier 25 or 26, depending on the setting of analog switch 24 in the transmit/receive circuit 15. Automatic gain control 47 adjusts the output of amplifier 46 to a predetermined level. Automatic gain control 47 contains a control comparator 48 and an integrator 49 which provides an output driving the gain of amplifier 46 upward when it is not up to the predetermined level at comparator 48 or reducing it to that level when it exceeds the predetermined level. Comparator 48 is directed to high-low detector 50 which is connected to integrator gate 51. Gate 51 provides an input to either the inverting or non-inverting input integrator 49.

The output of amplifier 46 is connected to low level detector 52 which includes amplifier 52a. The output of amplifier 52a is directed to control comparator 48 in the AGC loop for amplifier 46. The detector 52 amplifier 52a, a differentiator 53, and a comparator 54 are connected serially and are the major components of the trigger circuit disclosed in copending U.S. Pat. application Ser. No. 250,760.

A cross over comparator 57 also receives the output of amplifier 46 and is connected to a gate 58. A nand gate 59 is connected to set the gate 58 and has two inputs. The first input is the trigger signal emanating from comparator 54, and the second is a path to ground applied by a receiver mode switch 60, the position of which determines whether the output from cross over comparator 57 or the output from the trigger circuit comparator 54 is utilized as the received and conditioned signal. Gate 58 is connected to a charge dispenser 61 and a comparison gate 62. A one shot device 63 delays the reference pulse for the one shot pulse width and then delivers it to gate 62 through a reference pulse gate 64 for comparison with the received signal from gate 58.

The guard signal from control section 17 is connected to a received signal AGC reset comparator 65. It is also connected to charge dispenser 61 and comparator 54 to inhibit those three devices during the dwell time of the guard pulse. The guard signal is inverted and delivered to the input of a "no signal" gate 66 and the charge dispenser 61. An early/late gate 67 receives the output from gate 62 and the charge dispenser 61. A pulse at either an early or a late output from gate 67 is provided depending on the early or late status respectively of the received pulse.

The transmit pulse from control section 17 enables gate 64 as well as the high-low detector 50 and an additional gate 67. This additional gate 68 is reset by a signal from gate 58 and produces an output enabling the "no signal" gate 68.

Figure 7:
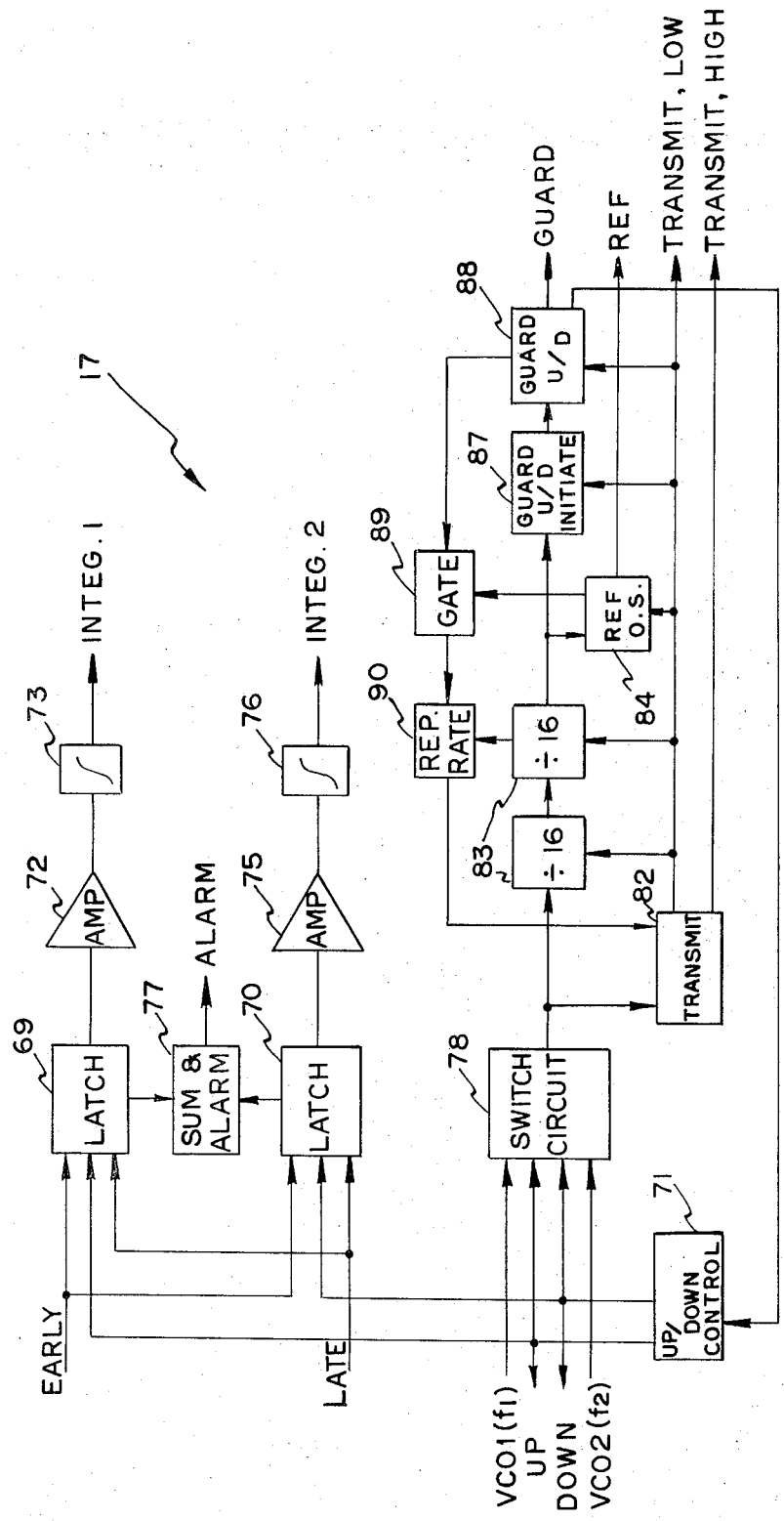
FIG. 7 is a block diagram of the control section of the system.

The control section 17 of the system provides generally for the generation of the transmit pulse signal, a portion of the delay time and subsequent generation of the reference pulse, generation of the receiver guard signal, the up/down control signals, and the integrator outputs which are utilized as control signals in the synthesizer circuit 18. Referring now to FIG. 7 a block diagram is shown for the control section 17. Signals are received from the detector section 16 indicating the early or late status of the received pulse. Latch circuits 69 and 70 are alternately enabled by up/down flip-flop 71 to pass a signal depending on whether the received signal is early or late. A signal from latch circuit 69 is connected to either the inverting or noninverting input of amplifier 72 which provides an input to a first integrator 73. In a similar manner a signal generated from latch circuit 70 is connected to the inverting or noninverting input of amplifier 75 which in turn provides an input to a second integrator 76. Output from both integrators 73 and 76 is directed to the synthesizer circuit 18.

Normal operation of the circuit requires continuing changes of state in both latch circuits 69 and 70 which are monitored by summing and alarm circuit 77. If either or both latch circuits 69 and 70 cease to change state for a specified period of time an alarm indication is provided by alarm circuit 77.

The control section 17 also receives two frequencies from the synthesizer 18 which are directed to switching circuit 78 which performs a single pole/double throw function. Switching circuit 78 also receives inputs from the up down control flip flop 71. The "up" signal from up/down 71 is also directed to the transmit/receive circuit 15 for control of analog switch 24.

Switching circuit 78 is connected to transmit pulse generator 82 and also to divider circuit 83. Divider circuit 83 is connected to reference pulse generator 84 and to a pulse generator 87. Pulse generator 87 is in turn connected to guard pulse generator 88 which affords a guard signal and an input to the up/down control 71. Receiver guard 88 also provides one input to a gate 89 which is connected to a repetition rate pulse generator 90. Pulse generator 90 is connected to enable the transmit pulse generator 82.

A signal from receiver guard 88 is connected to the detector section 16 and the signal from the reference pulse generator 84 is delivered to both the detector section 16 and transmit/receive section 15. The two signals from the transmit pulse generator are of opposite polarity. The low transmit pulse is connected to the detector circuit 16 and the high transmit pulse is delivered to the transmit/receive circuit 15.

Figure 9:
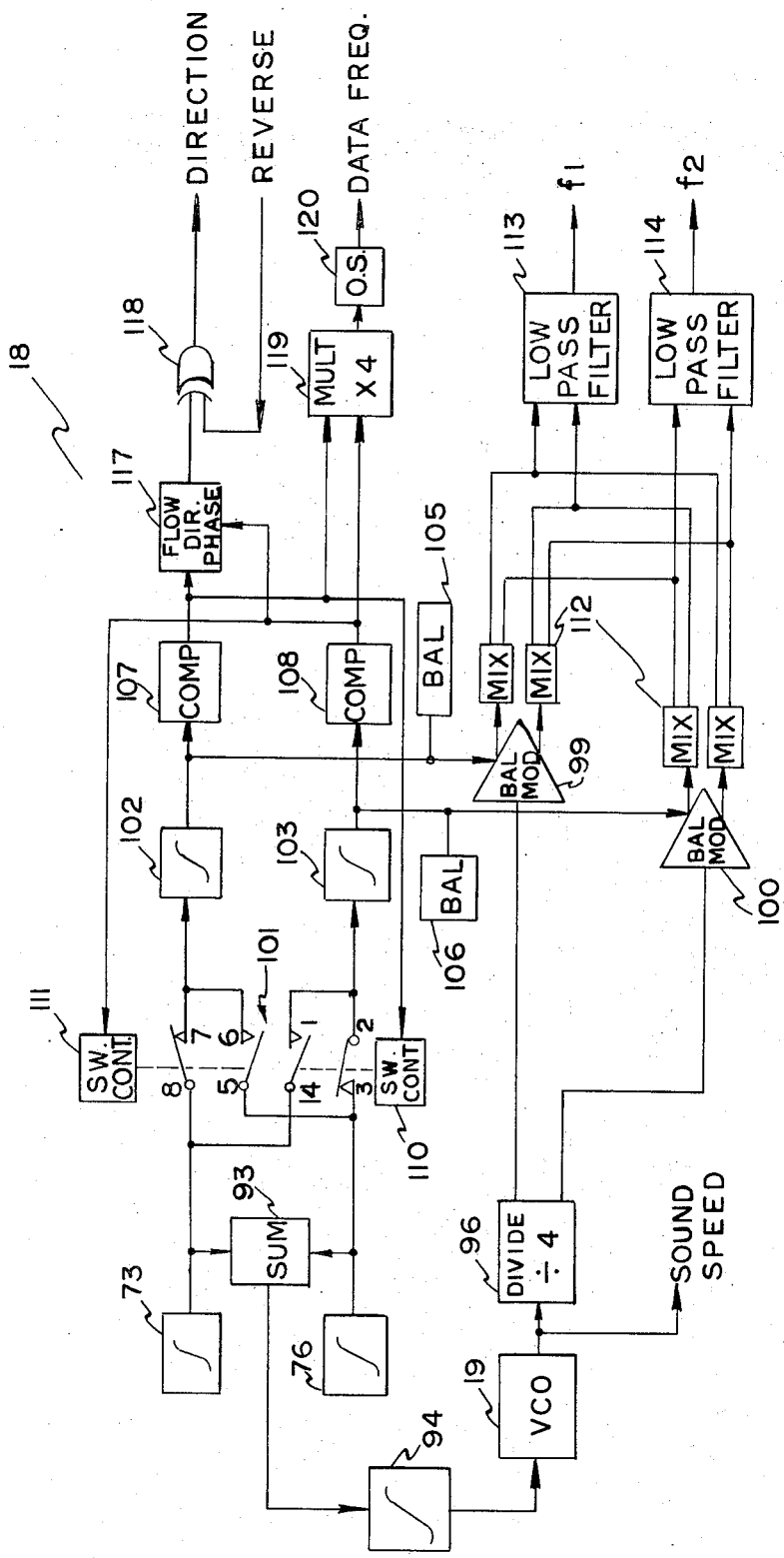
FIG. 9 is a block diagram of the frequency synthesis section of the system.

Referring now to FIG. 9 a block diagram of the frequency synthesizer section 18 of the system is seen. In accordance with well known upper and lower sideband separation techniques, balanced modulation, and linear frequency mixer utilization, frequencies are synthesized proportional to upstream and downstream propagation velocities. First and second integrators 73 and 76 from control circuit 17 are again depicted. The integrators 73 and 76 are seen to be connected to a summing circuit 93 which provides a mean value of the two integrator outputs to an integrator 94. Integrator 94 functions as the control signal generator for the high frequency VCO 19. Divider circuit 96 receives the output of high frequency VCO 19 and generates two signals in quadrature at one quarter of the frequency of the oscillator 19. These square wave signals, which may be referred to as sine theta and cosine theta are delivered to balanced modulators 99 and 100 respectively.

The signals from the first and second integrators 73 and 76 are also delivered through switches 101 to fast integrators 102 and 103. The output of integrators 102 and 103 are directed to modulators 99 and 100 respectively. The output signals from modulators 99 and 100 are balanced by potentiometers 105 and 106 respectively.

The outputs from the fast integrators 102 and 103 are also delivered to comparators 107 and 108 which provide a square wave output at the output frequency and the relative phase of the fast integrators 102 and 103. The outputs from comparators 107 and 108 are utilized to actuate switch controls 110 and 111 respectively. Switches 101 are positioned by virtue of such control to provide trapezoidal wave forms in quadrature at the outputs of fast integrators 102 and 103 which may be referred to as sine $\phi$ and cosine $\phi$ respectively.

The balanced modulated output signals from modulators 99 and 100 are connected to linear frequency mixers 112 which are in turn connected in predetermined combinations to low pass filtering circuits 113 and 114. The frequency outputs from filters 113 and 114 are proportional to upstream and downstream sound propagation velocities respectively as will be shown in the functional description which follows. These two frequencies are delivered to control circuit 17 as synthesized outputs from first and second voltage controlled oscillators.

The outputs of comparators 107 and 108 are connected to a flow direction phase detection gate 117 which in turn provides an input to an exclusive OR gate 118. Gate 118 provides an output indicative of flow direction. The outputs from comparators 107 and 108 are also directed to a multiplier circuit 119 which provides an output at four times the comparator output frequency. A one shot device 120 receives the output from multiplier 119 and provides a data frequency output having a constant charge in each data pulse.

The data frequency from one shot device 120 is proportional to flow as mentioned before. Several means by which the data frequency may be reduced to readable form are displayed in FIG. 11. First there is the well known method and circuitry provided in a digital to analog converter 123. Second the data frequency pulses by design present a constant charge per pulse so that they may be used to drive a frequency to analog converter 124. Such a frequency to analog device might take the form of a D'Arsonval meter movement with a mechanical action urged by the data frequency pulses which are filtered or smoothed by the inertia of the mechanical action in the meter. A third means of reducing the data frequency is through the injection of time calibration.

Figure 11:
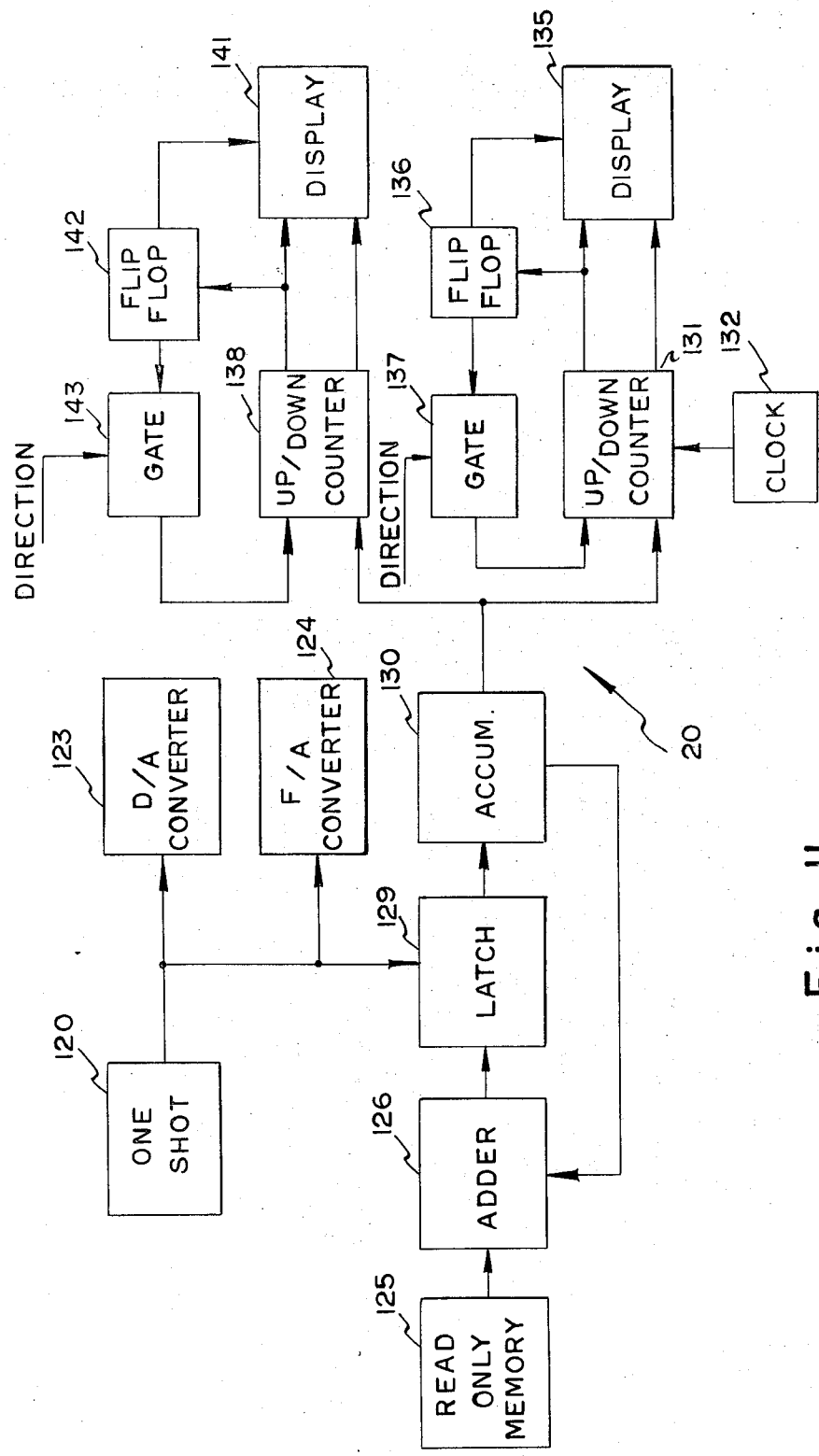
FIG. 11 is a block diagram of the time calibration section of the system.

FIG. 11 shows a read only memory 125 which has a program patch and which is connected to an adder 126. The adder 126 is connected to one of the inputs of a latch 129. Latch 129 also receives the data frequency from the one shot device 120. The output of the adder 126 is transferred through the latch 129 to an accumulator 130 by a data frequency pulse. The output of the accumulator 130 is directed back to the adder 126.

Upon accumulation of a predetermined number of pulses the accumulator 130 generates a carry pulse which may be sent to circuitry which will either provide flow rate information or total flow information. In the type of circuit providing flow rate information the carry pulse is directed to an up-down counter 131. An input from a clock 132 is connected to the up-down counter 131. A borrow and a carry output are connected from the up-down counter 131 to a flow rate display 135. The borrow output is connected to the input of a flip flop device 136. Outputs from the flip flop 136 are directed to the flow rate display 135 and to an exclusive OR gate 137. Another input to the OR gate 137 is provided by the output of the exclusive OR gate 118 in FIG. 9. The output of gate 137 is directed to the counter 131 to direct the counter to count up or down.

Should the flow information be desired in terms of totalized flow the carry pulses from the accumulator 130 are directed to a second up-down counter 138. A total flow display 141, a flip-flop 142 and an exclusive OR gate 143 are connected in a manner identical to that described for the flow rate display above. A reset function is provided in the second counter 138 to provide for clearing prior counts to begin a new total.

Referring to FIG. 2 there is seen a detailed block diagram of the entire system and the interconnections between the major sections.

We turn now to the operation of the system just described. In the most general sense a transmit signal is generated, transmitted upstream of the flow, received, conditioned and used to trigger a transmit signal which is transmitted downstream of the flow. This process is repeated, transmitting alternately upstream and downstream. In this fashion upstream and downstream transmission repetition rates arise proportional to frequencies hereinafter referred to as upstream and downstream frequencies. Referring to FIG. 3 the generation and reception of a transmitted pulse will be discussed. Assuming that the up-down control from control section 17 selects transmitter one shot device 21, a square positive going pulse is applied to the input of transmitter amplifier 29. A negative going pulse from the high voltage regulated supply 44 is directed to the upstream situated transducer 33 in the pipe wall 35. Diodes D1 and D2, seen in FIG. 4, perform an important receiver noise isolation function. In the circuit being described they have a 0.7 volt junction potential which must be overcome prior to conduction. All noise from power supply 44 and the remainder of the transmitter circuitry is below 0.7 volts.

Energy transferred to the flowing medium is received by the down stream transducer 34 and delivered to the input of receiver amplifier 25. The same up control pulse which selected transmitter one shot 21 also directs the analog switch control 24 to close the switch at the output of receiver amplifier 25 while maintaining the switch at the output of receiver amplifier 26 in the open condition. Thus the received pulse from amplifier 25 is delivered to the tank circuit 27 which is tuned to the received pulse frequency. A gain in received pulse amplitude is obtained through resonance in the tank circuit 27 which also suppresses undesired frequency components in the received pulse in the manner of a band pass filter. The received pulse is then directed to receiver 46 in the detector section 16.

The received signal is also directed from tank circuit 27 to a received pulse amplitude detector 39 which is a voltage comparator. The comparator 39 is connected to the high-low signal latch 40 which controls the integrator 41. The integrator 41 controls the output level of high voltage regulator 44 which provides the high voltage transmit pulses. This provides an AGC loop wherein a constant received pulse height is maintained by adjusting the transmitted pulse height.

The output of integrator 41 also works into a comparator 45 which produces an output when the transmitted pulse reaches a predetermined high level. The output of comparator 45 actuates an alarm because a high transmitted pulse level is produced through the AGC loop by a low received pulse level indicating probable malfunction in the system. for higher Having transmitted a pulse in a down-stream direction the up-down control from control section 17 now selects transmit one shot 22 to provide an input to transmitter amplifier 32 which in turn produces a negative going high voltage transmit pulse to transducer 34. The energy is transmitted in a relatively upstream direction and received by transducer 33. The received signal is delivered to receiver amplifier 26 and through the switch at the output of amplifier 26 which is closed by the same signal which selected transmit one shot 22 to produce the transmit signal. The remainder of the transmit receive circuit functions identically whether transducer 33 or transducer 34 functions as the receiver.

Turning now to the detector section 16 reference is made to FIG. 5. The received signal from the transmit receive section 15 is presented at the input to the amplifier 46. The received signal is conditioned and presented to gate 58 as disclosed in copending U.S. Pat. application Ser. No. 250,760. The receiver mode switch 60 provides a low input to nand gate 59 when it is closed to ground. Gate 59 presents a continuous up state so the set input of gate 58 under this condition. The output from comparator 54 resets gate 58 and the next pulse from cross-over comparator 57 fires gate 58. In the case of flowing media injecting too much phase noise in the output of cross-over comparator 57 the receiver mode switch 60 is opened. This places a high state on one input of the nand gate 59 which allows a low output to be sent to the set input of gate 58 each time comparator 54 produces a pulse. The pulse from comparator 54 connected to the reset of gate 58 initiates the output of gate 58 directly in this instance.

The output of gate 58 represents the time of arrival of the received pulse and is delivered to gate 62 for comparison with the time of arrival of the reference pulse from control section 17. The reference pulse is delayed by a negative going pulse from one shot device 63 which provides an input to the reference pulse gate 64. Gate 64 is reset by the low transmit pulse from control section 17 and fires on the rise of the delay pulse from one shot 63 to provide the delayed reference pulse to comparison gate 62. The delay is carefully adjusted to match the delay imposed on the received pulse as disclosed in copending U.S. Pat. application Ser. No. 250,760. The received pulse from gate 58 is also connected to charge dispenser 61. The charge dispenser produces a pulse with a width extending from the end of the received pulse to the beginning of the next guard pulse from control section 17. The early/late gate 67 contains a pair of nor gates which receive the outputs from the comparison gate 62 and the charge dispenser 61 and provide a signal at either an early or a late output terminal. The inputs to gate 67 are connected so that a downgoing signal appears at the early output if the received signal arrives at the comparison gate 62 prior to the reference pulse from gate 64. Conversely a down going signal appears at the late output of gate 67 if the received pulse is later than the reference pulse.

The low transmit pulse is also used to reset the additional gate 68 which is then fired by the output from gate 58. The high output state of gate 68 is connected to the no signal gate 66. One output from the no signal gate 66 is held in a down state by the signal from gate 68. The inverted guard pulse holds the same output from gate 66 down while the gate 68 is being reset. A continuous down output from gate 66 is an indication of normal received signal operation and conversely an up output from gate 66 indicates a probable malfunction since received signal outputs are not being produced from gate 58.

The low transmit pulse also resets the high-low detector 50. The outputs from detector amplifier 52a is connected to the AGC control comparator 48 and the AGC reset comparator 65. The output of control comparator 48 is connected to the high/low detector 50. The reference voltage at the control comparator 48 is less than that at the reset comparator 65. When the output from the detector amplifier 52a is higher than the reference set in control comparator 48 it produces a signal directed to the high/low detector 50. The high/low detector 50 output is sent to integrator gate 51. The output from gate 51 is connected to the input of integrator 49 which results in a gain control signal from integrator 49 which decreases the gain of amplifier 46. When the output from detector amplifier 52a exceeds the reference set in reset comparator 65 an output is produced which when delivered to the integrator gate 51 generates an output from gate 51 which continuously drives integrator 49 in a direction to reduce the gain of amplifier 46. This latter feature is a backup for the control comparator function. Integrator gate 51 is set to urge amplifier 46 to a high gain condition until directed otherwise by control comparator 48 or reset comparator 65.

Turning now to the operation of the control section 17 of the system reference is made to FIG. 7. Latches 69 and 70 each contain two pair of nor gates. An early or a late signal arriving from the detector section 16 is in the form of a down going pulse. Thus an up indication from up/down control 71, which is in fact a low state, enables the first pair of nor gates in latch 69 while the simultaneous high state signal from up/down control 71 to latch 70 blocks the first pair of nor gates contained therein. Latch 69 is now in a condition to conduct either an early or a late pulse to amplifier 72. An early pulse is directed to the inverting input of amplifier 72, and a late pulse is directed to the non-inverting input. The resulting output from amplifier 72 is directed to the inverting input of integrator 73 causing the integrator output voltage to rise in the case of an early received pulse and to fall in the case of a late received pulse.

The outputs from the first pair of nor gates contained in latch 69 are also delivered to a second pair of contained nor gates in such a manner as to cause their output states to change each time a transition is made between an early and a late pulse through the latch 69. Latch 70 functions in a manner similar to latch 69, sending an early or a late pulse to the inverting or non-inverting input respectively of amplifier 75 which in turn produces an output driving integrator 76 in the same fashion as described for integrator 73 above. Latch 70 also produces a constantly changing state from a contained second set of nor gates if there is a constant transition between early and late pulses passing through to integrator 76. The changing states from latches 69 and 70 as a result of early/late transition are both directed to a summing and alarm circuit 77. Alarm circuit 77 contains a retriggerable one shot device which holds an alarm indication in a constantly up state as long as both latches 69 and 70 produce changes in state within the one shot period of the retriggerable device. In the event either latch 69 or 70 fails to display changes of state within such period, the alarm output falls to a low state indicating malfunction in the system.

Figure 12:
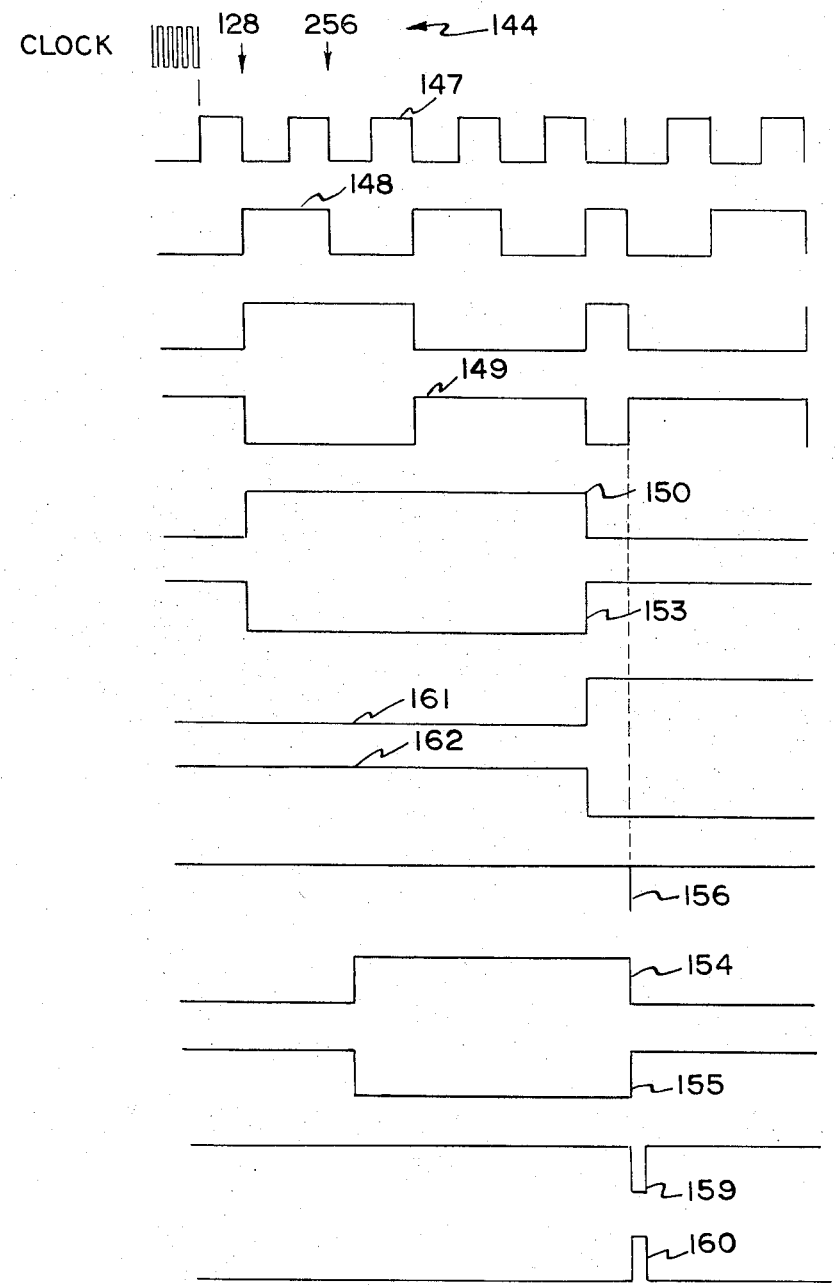
FIG. 12 is a timing chain diagram of the signals in the control section of the system.

Referring now to FIG. 12 there is pictured a timing chain for a portion of the control section 17. A clock frequency 144 is shown as a relatively high frequency and is the synthesized frequency $f_1$ or $f_2$ which is generated in the synthesizer section 18 and connected to the switch circuit 78. Switch circuit 78 passes either $f_1$ or $f_2$ depending upon the state of the up/down control 71. For example when the up/down control 71 is in the up selection condition it passes $f_1$ through the switch circuit 78 and blocks $f_2$. $f_1$ is delivered to the clock input of the divider 83. A repetition rate pulse 147 is generated by the divider circuit 83 which has a period of 128 clock pulses. A second divider output pulse 148 rises at the end of 128 clock pulses and falls at the end of 256 clock pulses. The second divider output 148 is connected to the guard and up/down initiate pulse generator 87. Pulse generator 87 fires on the rise of divider output 148 and terminates on the subsequent rise of pulse 148 to provide the pulse 149. Pulse 149 is connected to the guard and up/down pulse generator 88. Pulse generator 88 provides output pulses 150 and 153 on the fall of pulse 149. Pulse 150 is delivered to one input of gate 89. The second divider output pulse 148 is delivered to the reference pulse generator 84 and generates a pair of outputs 154 and 155 on the fall of the pulse 148. Pulse 154 is directed to the transmit receive section 15 to allow comparator 39 to function during its dwell time and to enable the high-low signal latch 40. Pulse 154 is also connected to detector section 16 where it is processed and compared in time phase with the processed received pulse. Pulse 155 from the reference pulse generator 84 is directed to the second input of gate 89. Pulse 150 returns to a low state while pulse 155 is in a low state producing a signal from the nor gate 89 which resets the repetition rate gate 90 which is in turn fired on the next rise of the repetition rate pulse 147. The output of gate 90 is seen as the spike 156 which is connected to the transmit pulse generator 82. A low transmit pulse 159 and a high transmit pulse 160 appear immediately at the outputs of transmit pulse generator 82. The low transmit pulse 159 immediately resets the dividers 83 beginning a new sequence for the repetition rate pulse 147 and the second divider output pulse 148. It also resets the guard and up/down initiate pulse 149 and the high low reference pulses 154 and 155 to their normal states.

The up/down pulse 153 is connected to the up/down control 71. Pulse 153 rises prior to the time of generation of the transmit pulses 159 and 160. This changes the output control states at up/down control 71 as shown by up control pulse 161 and down control pulse 162. Thus the up/down control 71 is turned around to set the appropriate switches and allow for a change in direction of transmission prior to the generation of the subsequent transmit pulse 160.

The repetition rate pulse 147 was selected to recur at a specific rate relative to the clock frequency $f_1$ or $f_2$ for the purpose of supplying a transmit pulse 160 at a point in time when echoes existing in the flowing medium due to previous transmit pulses are at a minimum. In this embodiment the transmit pulses are spaced in time at 2.75 times the period of time required for the energy pulse to be propagated through the fluid. It can be seen that all of the pulses depicted in FIG. 12, while they may vary collectively in width or time of recurrence, remain precisely in the same proportion to one another in these respects since they are all governed directly or indirectly by the clock frequencies $f_1$ or $f_2$. Thus the same circuit is utilized and the same pulse relationships obtained for small or large diameter pipes, or for fluids of widely varying sound speeds.

For an explanation of the functional characteristics of the synthesizer section 18 of the system, reference is made to FIG. 9. The two integrators 73 and 76 from control section 17 are shown providing inputs to the summing circuit 93. As long as the propagation velocity in the fluid is not changed by some change in fluid characteristic the outputs of integrator 73 and 76 will vary equally in opposite directions. Thus their mean value will remain constant at zero and the output of summing circuit 93 will provide no drive to integrator 94. In the case where a fluid sound speed change is experienced, one of the integrators 73 or 76 will provide a greater change in output in one direction than provided by the other in the opposite direction. This gives rise to a change in the mean value from the summing circuit 93, which in turn provides a drive to the integrator 94. Integrator 94 shows an output change which is delivered to the input of the high frequency VCO 19 altering the output frequency. It can be seen that the output frequency of the VCO 19 is constant for constant propagation velocities within the flowing medium. It will rise for higher velocities of propagation and fall for lower velocities. Thus it is a quantity proportional to the propagation velocity within the flowing medium.

Figure 15:
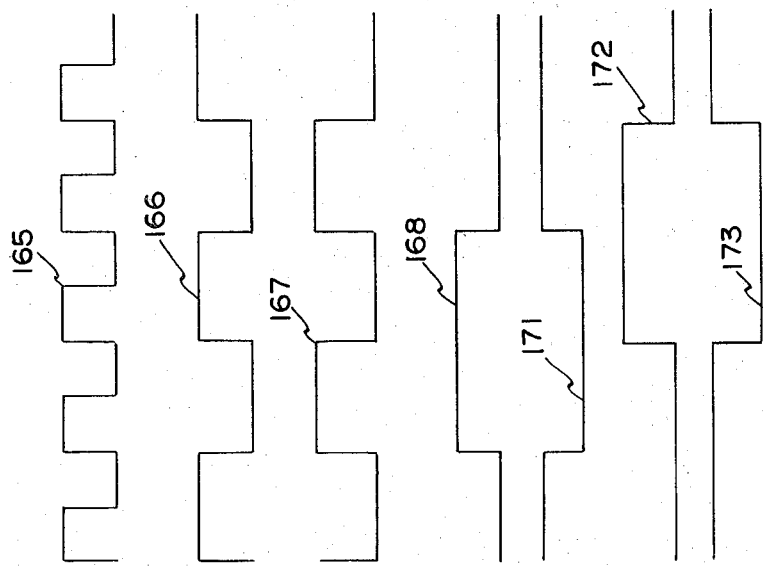
FIG. 15 is a timing chain diagram showing the division of the high frequency VCO output frequency in the frequency synthesis section of the system.

Referring to FIG. 15 the output frequency 165 is shown from VCO 19. Frequency 165 is delivered to a frequency divider 96 where the frequency 165 is reduced by a factor of 4 and two output frequencies are produced in quadrature. The frequency division and quadrature is obtained in the following fashion. A first edge triggered flip-flop contained in divider 96 receives the frequency 165 and produces outputs of opposite polarity 166 and 167 which are initiated and terminated on the rise of pulse 165. Pulse 167 is delivered to a second edge triggered flip-flop contained in divider 96 which generates pulses 168 and 171 on the rise of pulse 167. Pulse 166 is delivered to a third edge triggered flip-flop contained in divider 96 which is fired on the rise of pulse 166 and produces outputs 172 and 173. Outputs 168 and 172 can be seen to be in a 90° phase relation. Thus pulse 168 may be termed cosine $\theta$ and pulse 172 may be termed sine $\theta$. The edge triggered flip flops generating pulses 168 and 172 are cross coupled in a manner insuring constant phase relationship and preventing quadrature inversion. Pulse 168 is delivered to the input of modulator 100 and pulse 172 is delivered to the input of modulator 99.

Figure 13:
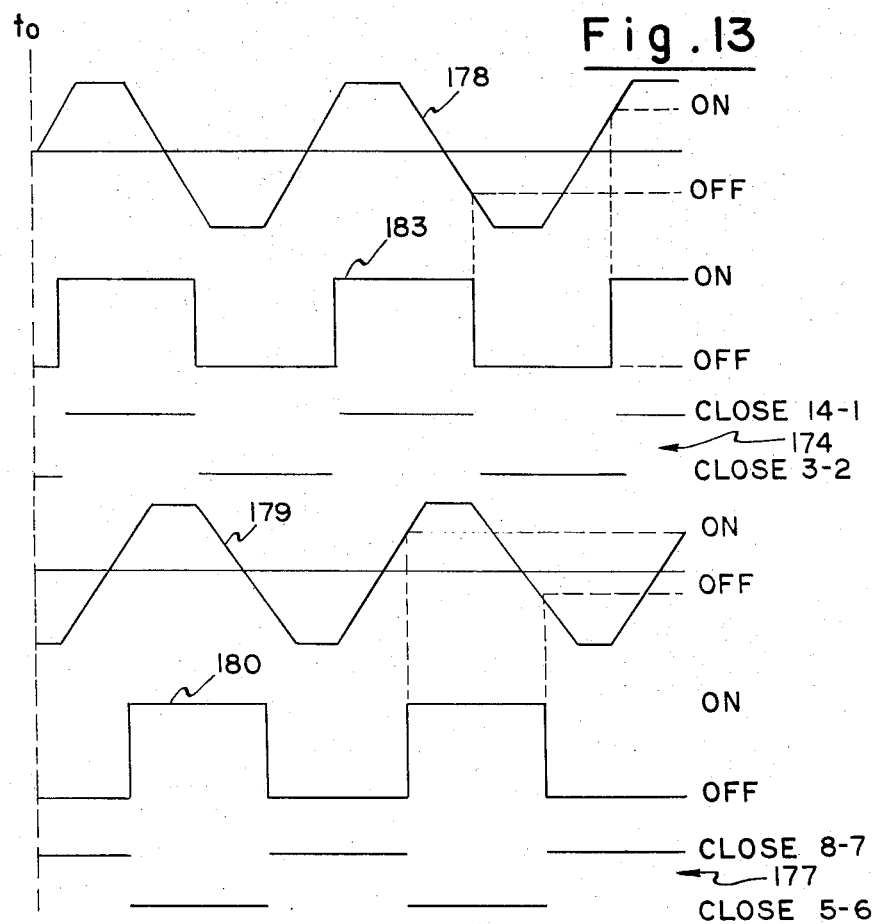
FIG. 13 is a timing chain diagram of the data frequency and control signals in the frequency synthesis section of the system.

Turning now to FIG. 13 the synthesis of the difference frequency is shown. Switches 101 are shown in their closed state by the solid lines 174 for the lower switch and 177 for the upper switch. At time zero the upper switch contacts 8 and 7 are seen to be closed which delivers the output of integrator 73 to the fast integrator 102. Also at time zero the switch contacts 3 and 2 are seen to be closed which delivers the output of integrator 76 to the input of fast integrator 103. Fast integrator 102 produces the output 178 which can be seen to rise from zero at time $t_o$ to its saturation point. The output of fast integrator 102 is directed to the input of comparator 107 causing an output 183 therefrom as the integrator output 178 passes through a preset comparator "on" voltage. The output 183 is directed to switch control 110 which opens switch contacts 3 and 2 and closes switch contacts 14 and 1 as shown by switch closure diagram 174. At this point the output from integrator 73 is directed to the input of fast integrator 103 and the latter begins to produce an increasing output voltage until it reaches its upper saturation limit as shown by wave form 179. As the integrator output 179 approaches its upper saturation limit it passes through a preset comparator "on" voltage adjusted at comparator 108. At this point comparator 108 produces an output 180 which is directed to switch control 111 and opens contacts 8 and 7 and closes contacts 5 and 6 as shown in switch closure diagram 177. This removes the output of integrator 73 from the input of fast integrator 102 and replaces it with the output from integrator 76. Fast integrator 102 thus begins to decrease its output to its lower saturation limit as shown by wave form 178. As the wave form 178 approaches its lower saturation limit it passes through a preset comparator off voltage which terminates the output from comparator 107 as shown by wave form 183. This signal is again taken to switch control 110 which opens switch contacts 14 and 1 and closes contacts 3 and 2. Integrator 73 is thus removed from the input of fast integrator 103 and the output from integrator 76 is applied thereto. Wave form 179 begins to decrease passing through a preset comparator "off" voltage and terminating the output from comparator 108 as shown by wave form 180. The comparator output 180 in turn repositions the switch contacts 8 and 7 to close and 5 and 6 to open through the action of switch control 111. This sequence is repeated to provide the two wave forms 178 and 179 which may be termed cosine $\phi$ and sine $\phi$ respectively. Cosine $\phi$ is directed to modulator 99 and sine $\phi$ is directed to modulator 100.

Figure 14:
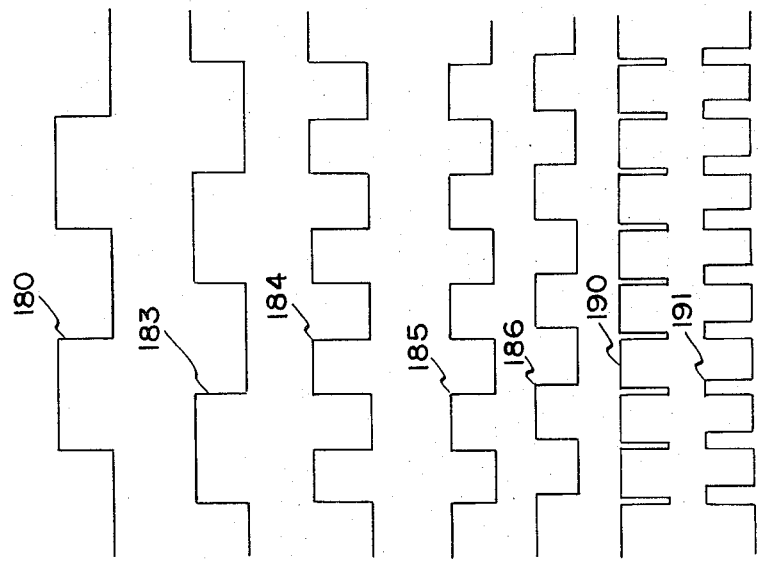
FIG. 14 is a timing chain diagram showing the multiplication of the data frequency in the frequency synthesis section of the system.

Referring now to FIG. 14 the manner in which the data frequency is obtained is described. The output 183 from the upper comparator 107 and the output 180 from the lower comparator 108 are directed to a circuit 119 which in this embodiment multiplies the frequency of wave forms 180 and 183 by a factor of four. The outputs are first delivered to the input of an exclusive OR gate which produces the pulse 184 when outputs 180 and 183 are at different states. The output 184 is seen to be double the frequency of pulses 180 and 183 since the latter are in quadrature. Pulse 184 is delivered to one of the inputs of another exclusive OR gate contained in multiplier circuit 119 which is also fed a constant down state at another of its inputs. This produces the output 185 which is merely an inversion of pulse 184. Pulse 185 is sent to a third exclusive OR gate in circuit 119 and is also directed through a series of three inverters back to a second input to the third OR gate. The three inverters impose a very small time delay on the second input to the third gate as shown by pulse 186. Thus the spike 190 is produced at the output of the third exclusive OR gate which is seen to be at four times the trapezoidal frequency as represented by the comparator outputs 180 and 183. The spike 190 is directed to the one shot device 120 which produces output pulses 191 at the same frequency as the spike 190 but of a constant pulse width and amplitude thus carrying a constant charge in each pulse.

The flow direction phase detector 117 is an edge triggered flip flop device which receives the inverted output of the comparator 107 as its clock input and the inverted output of comparator 108 at its data input. For normal forward flow the clock input leads the data input which provides a normally down state at the flow direction output which is connected to the exclusive OR gate 118. An up state is supplied to the other input to the gate 118 which provides an up indication at the output of gate 118 for normal forward flow direction. It can be seen that if the data input begins to lead the clock input the subsequent flow direction output to gate 118 will be an up state providing a down state output from gate 118 indicating reverse flow direction.

The balanced modulators 99 and 100 suppress both the carrier frequency $\theta$ and modulation frequency $\phi$ and produce the sum and the difference frequencies at their outputs. This is demonstrated by the following relationships.

$$COS\theta SIN\phi = \frac{1}{2}[SIN(\theta+\phi) - SIN(\theta-\phi)]$$

$$SIN\theta COS\phi = \frac{1}{2}[SIN(\theta-\phi) + SIN(\theta-\phi)]$$

The linear frequency mixers 112 receive the balanced modulator outputs in the following combinations which are equivalent to the quantities indicated below.

$$COS\theta SIN\phi - SIN\theta COS\phi = -SIN(\theta-\phi)$$

$$-COS\theta SIN\phi + SIN\theta COS\phi = SIN(\theta-\phi)$$

$$SIN\theta COS\phi + COS\theta SIN\phi = SIN(\theta+\phi)$$

$$-COS\theta SIN\phi - SIN\theta COS\phi = -SIN(\theta+\phi)$$

If the following relationship holds for the upstream frequency:

$$\theta - \phi = f_1$$

and the following relationship holds for the downstream frequency:

$$\theta + \phi = f_2$$

then the relationships below arise.

$$f_1 - f_2 = K\phi$$

$$f_1 + f_2 = K\theta$$

Since $\theta$ is a sub-harmonic of the output frequency of VCO 19 it can be seen that the output frequency of VCO 19 is proportional to the sum frequency, or the sound propagation velocity through a still fluid. Similarly since $\phi$ is the data output frequency it provides a signal proportional to the difference frequency which is an indication of flow velocity of the fluid.

Low pass filters 113 and 114 contain cross-over voltage comparators which receive the mixed frequencies and produce square wave outputs. The ripple on the mixed frequency input is removed in this fashion leaving only frequency $f_1$ at the output of low pass filter 113 which is proportional to the upstream speed of sound, and frequency $f_2$ at the output of low pass filter 114 which is proportional to the downstream speed of sound.

Turning now to the function of the time calibration circuit, reference is made to FIG. 11. A program is patched into the read only memory (ROM) 125 which represents a number which will provide a desired calibration of the data pulses from the one shot device 120. This number from the program contained in ROM 125 is presented to the adder 126. The total of the program number and the number from the accumulator 130 is presented to the input of the latch 129. The next data frequency pulse reaching the latch 129 transfers the total from the adder 126 through the latch 129 to the accumulator 130. This latter figure is added to the figure already in accumulator 130 and is instantly sent back to the adder 126. The accumulated figure and the number from the program in ROM 125 are added and the sum is immediately presented to the input of the latch 129. The next arrival of a data frequency pulse transfers the new sum to the accumulator 130 as before.

When the accumulator 130 has filled to a predetermined level a carry pulse is directed to the up-down counters 131 and 138. When flow is in the normal direction counter 131 counts up, is cleared by clock 132, and shows the count level at display 135. The display represents a calibrated quantity of flow per unit of time where the time period is determined by the period of the clock 132. In the event the flow direction is reversed the change in signal at the flow direction gate 118 causes the output of gate 137 to change state and to direct the counter 131 to count down, which means it must borrow since it has just been cleared. The borrow signal changes output state at the flip flop 136 which lights a minus sign on display 135 and also resets the output state of gate 137 so that the counter 131 counts in an up direction, marking it as reverse flow by the minus sign at the display 135.

Normal flow direction causes the up-down counter 138 in the total flow circuit to count up and show the total flow on the display 141 until the up-down counter 138 is reset. In the event the flow direction is reversed the signal from the exclusive OR gate 118 connected to the exclusive OR gate 143 causes a change in output state of gate 143 which directs the up-down counter 138 to count down. Display 141 will show a decrease in total flow until it reaches the zero level. At this point a borrow signal is sent to the flip-flop 142 which causes a minus sign to appear at display 141 and changes one of the input states to gate 143. This resets the output state of gate 143 and causes the counter 138 to revert to the count-up condition. The count-up is delivered to display 141 where the reverse flow total is indicated by the presence of the minus sign.

Figure 16:
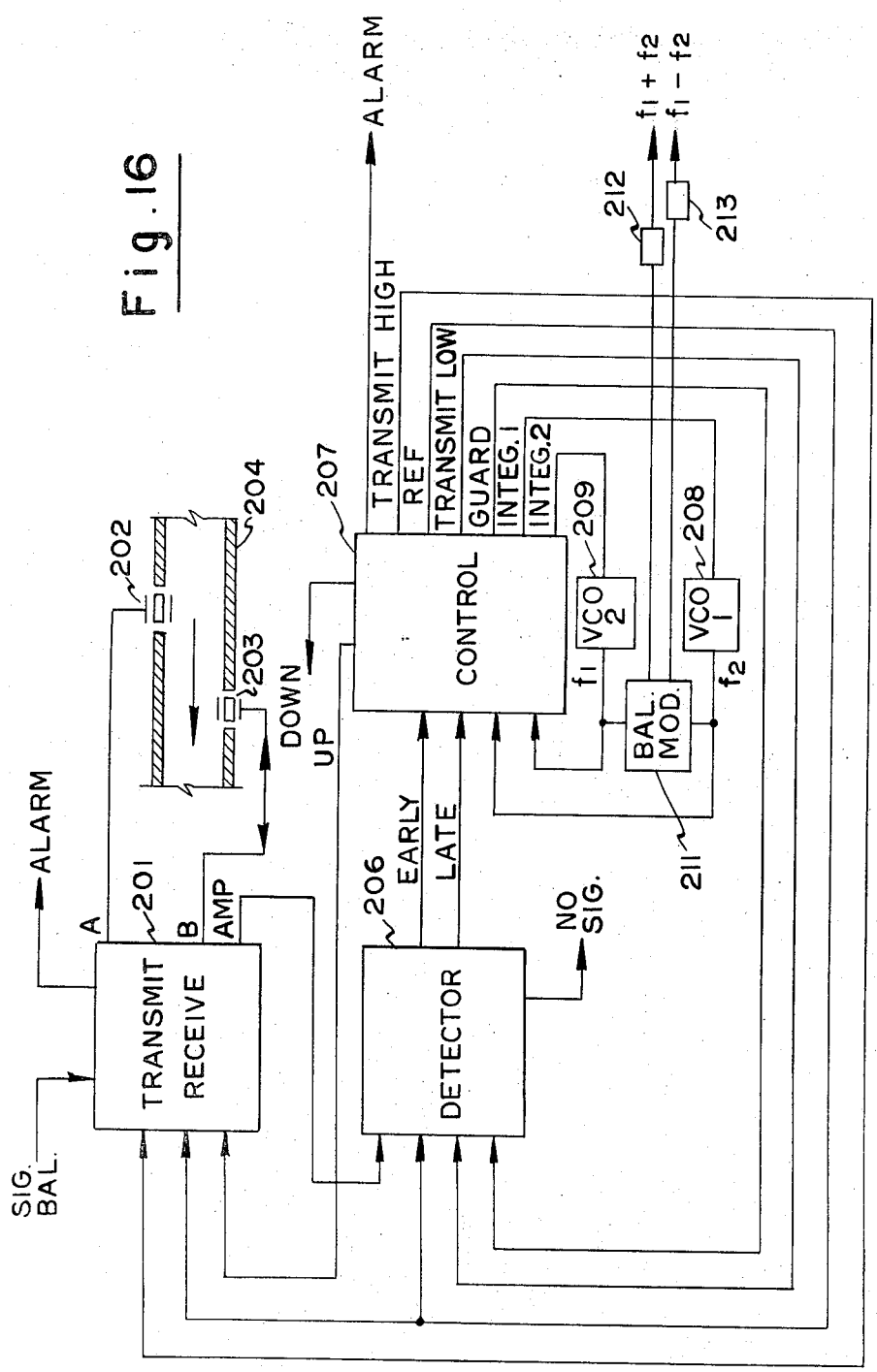
FIG. 16 is a detailed block diagram of a system including voltage controlled oscillators for frequency generation.

A second embodiment of the invention does not include the synthesizer section 18 previously described. This embodiment contains all the features of the system previously described but utilizes two separate voltage controlled oscillators to generate upstream and downstream frequencies. Referring to FIG. 16 a transmit receive section 201 is shown which provides signals to and receives signals from transducers 202 and 203 in the wall of a pipe 204 and in communication with a flowing medium contained therein. The received signal is directed to a detector section 206 which in turn provides early and late signals to a control section 207 as before. The first and second integrator outputs from control section 207 are directed to first and second voltage controlled oscillators 208 and 209 respectively. Frequency outputs from VCO's 208 and 209 are directed back to the control section 207 and utilized as described before, and are also directed to a balanced modulator 211 which produces the sum frequency and the difference frequency proportional to sound propagation velocity and flow velocity respectively. The frequency outputs of modulator 211 are sent to high pass filter 212 and low pass filter 213 which remove carrier and modulation components in the sum and difference frequencies respectively.

One form of the preferred embodiment has been constructed following the disclosure herein and used to meter the velocity of sound propagation and velocity and quantity of flow of water contained in several sizes of pipe. The circuitry utilized is shown in FIGS. 4, 6, 8 and 10.

Figure 4:
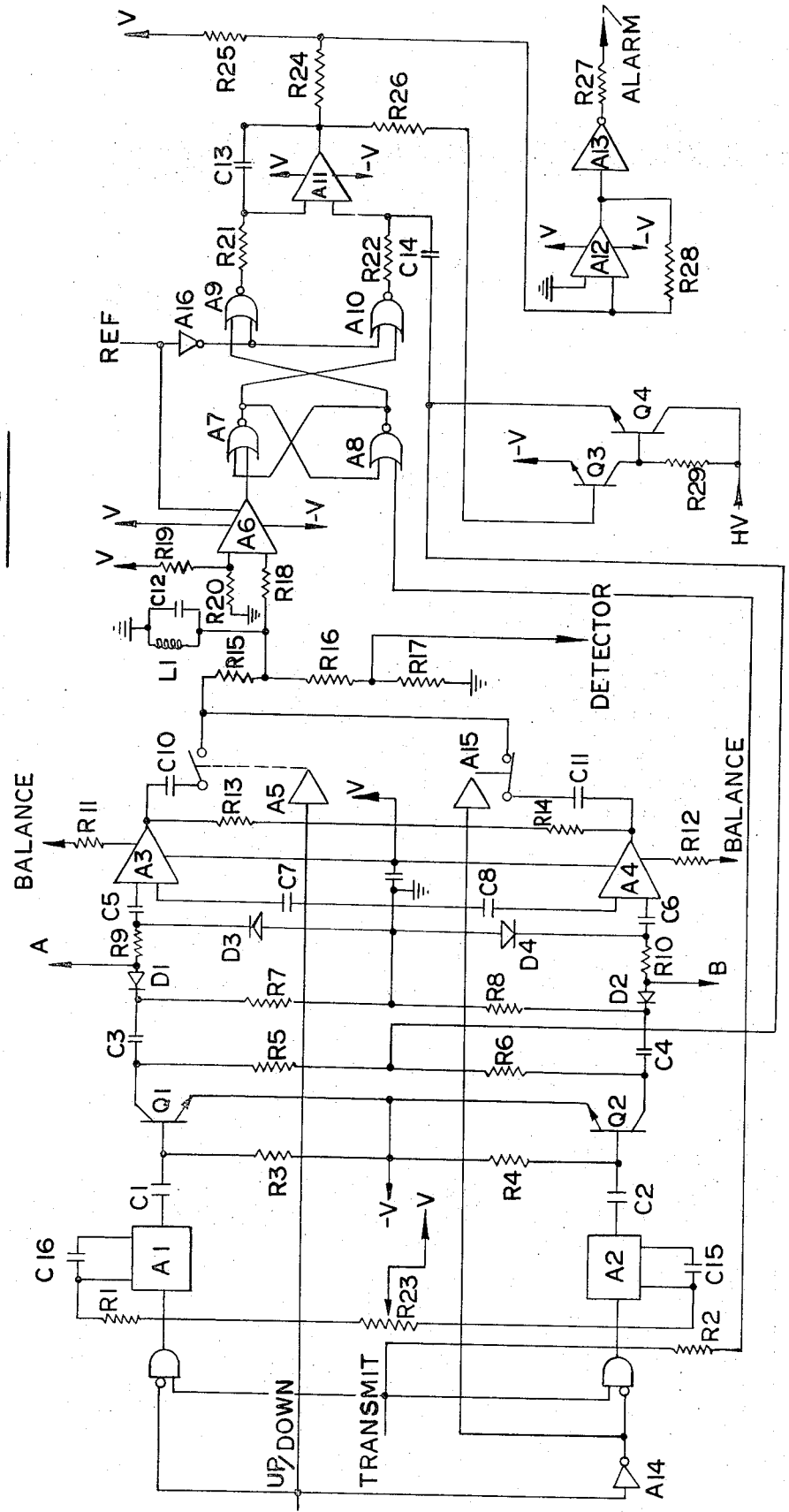
FIG. 4 is a schematic diagram of the transmit receive section of the system.

FIG. 4 shows the circuitry contained in the transmit receive section 15. This section of the circuitry generates the high voltage transmit pulse, receives the pulse from the transducer acting as a receiver, provides a first stage of received pulse amplification, and performs a high voltage transmit pulse regulation function. The various circuit components have the following values:

RESISTORS

| | | |
|---|---|---|
| R1 | Kilohms | 4.7 |
| R2 | " | 4.7 |
| R3 | " | 10 |
| R4 | " | 10 |
| R5 | " | 1 |
| R6 | " | 1 |
| R7 | " | 10 |
| R8 | " | 10 |
| R9 | Ohms | 470 |
| R10 | " | 470 |
| R11 | Kilohms | 10 |
| R12 | " | 10 |
| R13 | " | 1 |
| R14 | " | 1 |
| R15 | Ohms | 470 |
| R16 | Kilohms | 20 |
| R17 | Ohms | 470 |
| R18 | Kilohms | 47 |
| R19 | " | 8.2 |
| R20 | " | 1 |
| R21 | " | 470 |
| R22 | " | 470 |
| R23 | " | 10 |
| R24 | " | 10 |
| R25 | " | 11 |
| R26 | " | 10 |
| R27 | Ohms | 200 |
| R28 | Kilohms | 100 |
| R29 | " | 1 |

CAPACITORS

| | | |
|---|---|---|
| C1 | mf | .01 |
| C2 | " | .01 |
| C3 | " | .1 |
| C4 | " | .1 |
| C5 | " | .01 |
| C6 | " | .01 |
| C7 | " | .01 |
| C8 | " | .01 |
| C9 | mf | 1.00 |
| C10 | " | .01 |
| C11 | " | .01 |
| C12 | pf | 220 |
| C13 | mf | 1.00 |
| C14 | " | .1 |
| C15 | pf | 220 |
| C16 | " | 220 |

INDUCTORS

| | | |
|---|---|---|
| L1 | Microhenry | 100 |

SOLID STATE DEVICES

| | |
|---|---|
| A1 | SN74123N |
| A2 | SN74123N |
| A3 | MC1590G |
| A4 | MC1590G |
| A5 | DG152 |
| A6 | SN72514N |
| A7 | SN7402N |
| A8 | SN7402N |
| A9 | SN7402N |
| A10 | SN7402N |
| A11 | SN72741P |
| A12 | SN72514N |
| A13 | SN7404N |
| A14 | SN7404N |
| A15 | DG152 |
| A16 | SN7404N |
| D1-4 | 1N459 |
| Q1-4 | 2N2102 |

Figure 6:
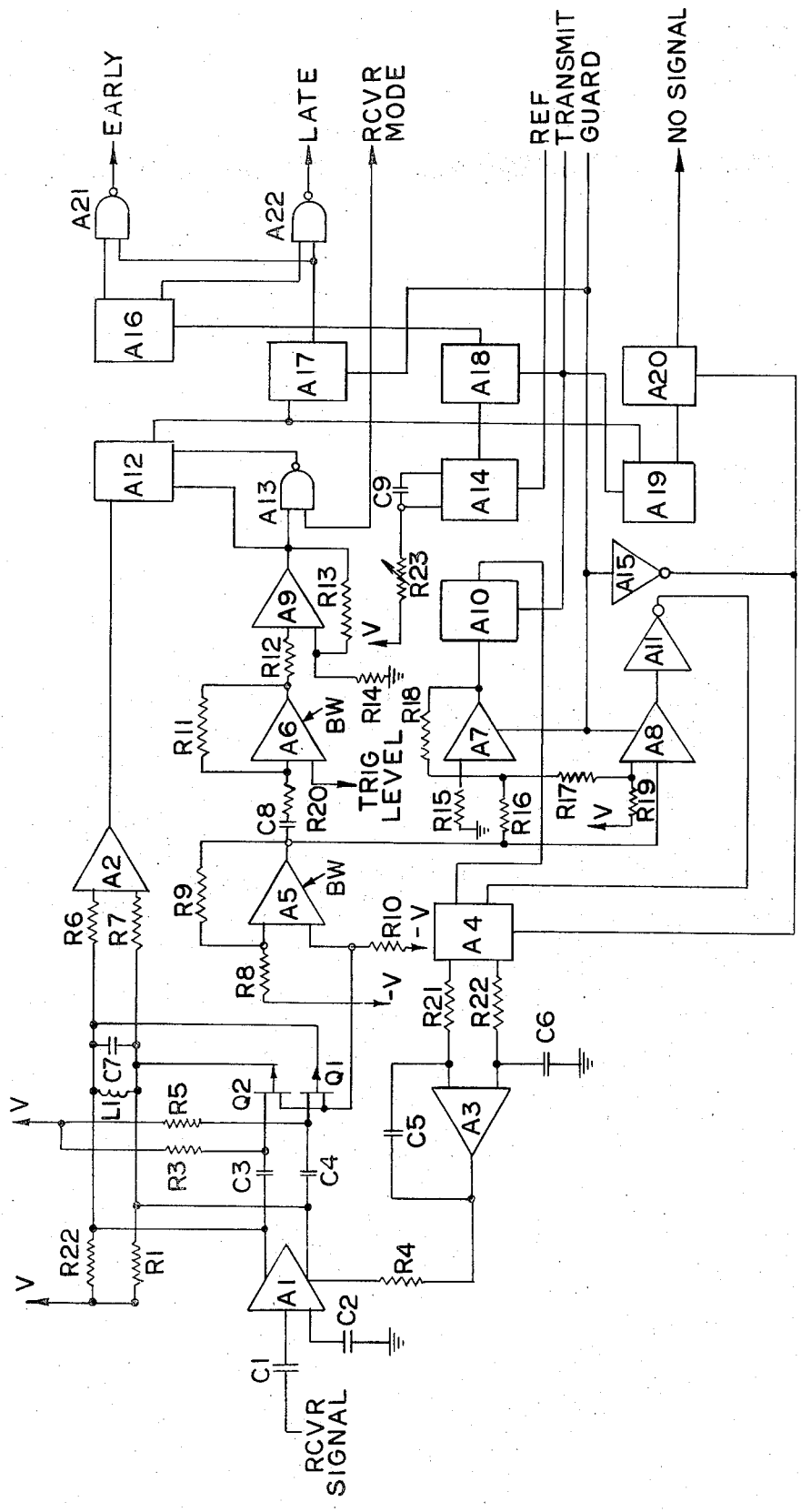
FIG. 6 is a schematic diagram of the detector section of the system.

FIG. 6 shows a schematic of the detector section 16 of the system. The received signal is processed in this part of the circuit. A trigger signal is generated as disclosed in copending U.S. Pat. application Ser. No. 250,760, and an early or a late determination for the received signal is made. The various circuit components have the following values:

RESISTORS

| | | |
|---|---|---|
| R1 | Kilohms | 1 |
| R2 | " | 1 |
| R3 | Megohms | 1 |
| R4 | Kilohms | 10 |
| R5 | Megohms | 1 |
| R6 | Kilohms | 10 |
| R7 | " | 10 |
| R8 | " | 10 |
| R9 | " | 20 |
| R10 | " | 47 |
| R11 | " | 15 |
| R12 | " | 10 |
| R13 | Kilohms | 47 |
| R14 | " | 10 |
| R15 | " | 2.7 |
| R16 | " | 10 |
| R17 | " | 1 |
| R18 | " | 20 |
| R19 | " | 20 |
| R20 | " | 1 |
| R21 | " | 470 |
| R22 | " | 470 |
| R23 | " | 14.7 |

CAPACITORS

| | | |
|---|---|---|
| C1 | mf | .01 |
| C2 | " | .01 |
| C3 | " | .1 |
| C4 | " | .1 |
| C5 | " | 1.00 |
| C6 | " | 1.00 |
| C7 | pf | 220 |
| C8 | mf | .001 |
| C9 | pf | 100 |

INDUCTORS

| | | |
|---|---|---|
| L1 | Microhenry | 100 |

SOLID STATE DEVICES

| | |
|---|---|
| A1 | MC1590G |
| A2 | SN72514N |
| A3 | SN72741P |
| A4 | SN7474N |
| A5 | HA2605 |
| A6 | HA2605 |
| A7 | SN72514N |
| A8 | SN72514N |
| A9 | SN72514N |
| A10 | SN7474N |
| A11 | SN7400N |
| A12 | SN7474N |
| A13 | SN7400N |
| A14 | SN74122N |
| A15 | SN7400N |
| A16 | SN7474N |
| A17 | SN7474N |
| A18 | SN7474N |
| A19 | SN7474N |
| A20 | SN7474N |
| A21 | SN7400N |
| A22 | SN7400N |
| Q1 | 2N4360 |
| Q2 | 2N4360 |

Figure 8:
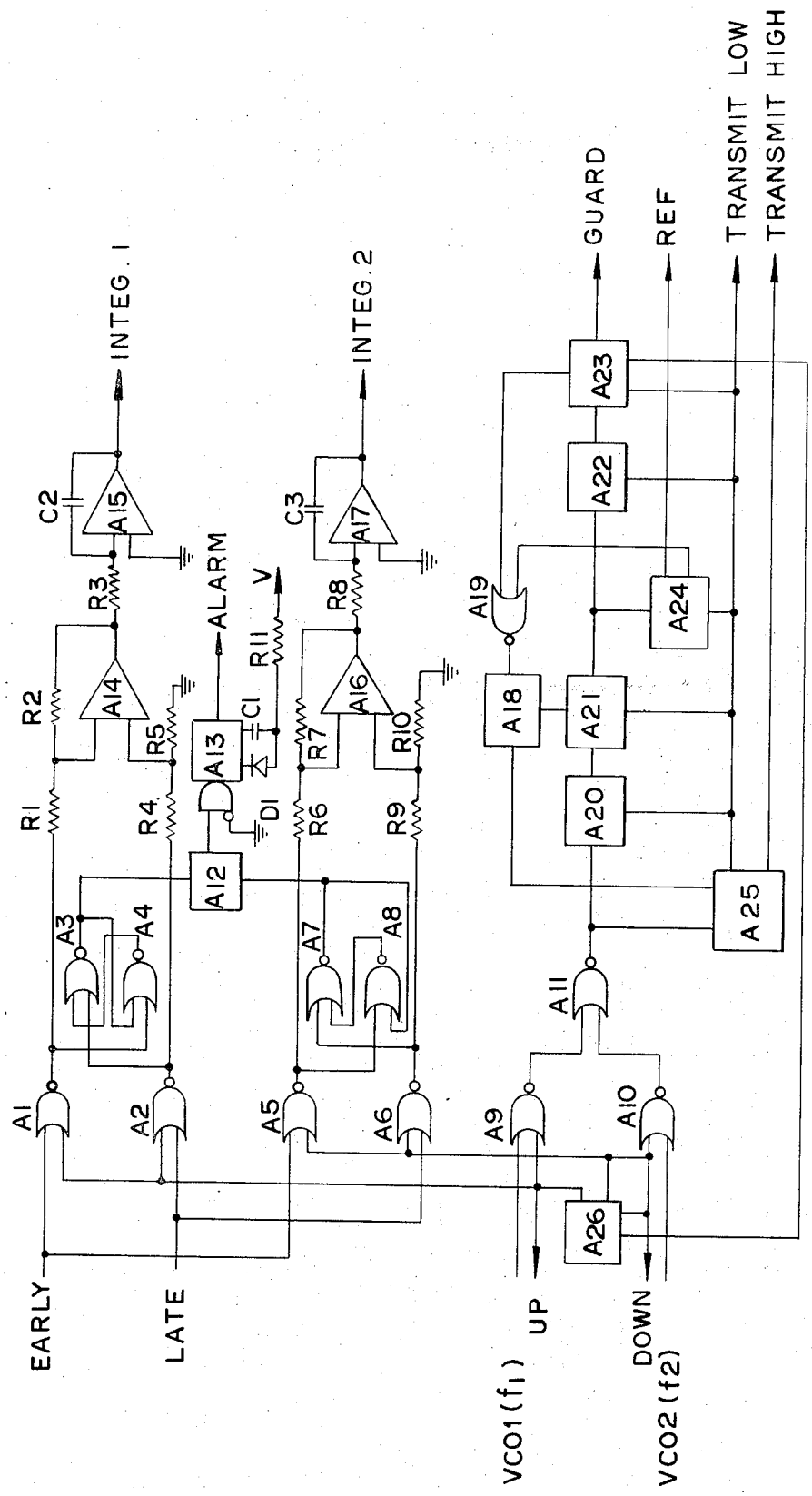
FIG. 8 is a schematic diagram of the control section of the system.

FIG. 8 shows a schematic of the control section 17 of the system. The early and late signals are transformed into control signals in this part of the circuit, and the time sequence is determined for the up/down, guard, reference, and transmit control signals. The various circuit components have the following values:

RESISTORS

| | | |
|---|---|---|
| R1 | Kilohms | 4.7 |
| R2 | " | 4.7 |
| R3 | " | 330 |
| R4 | " | 4.7 |
| R5 | " | 4.7 |
| R6 | " | 4.7 |
| R7 | " | 4.7 |
| R8 | " | 330 |
| R9 | " | 47 |
| R10 | " | 4.7 |
| R11 | " | 47 |

CAPACITORS

| | | |
|---|---|---|
| C1 | mf | 1 |
| C2 | " | 1 |
| C3 | " | 1 |

SOLID STATE DEVICES

| | |
|---|---|
| A1 | SN7402N |
| A2 | " |
| A3 | " |
| A4 | " |
| A5 | " |
| A6 | " |
| A7 | " |
| A8 | " |
| A9 | " |
| A10 | " |
| A11 | " |
| A12 | SN7474N |
| D1 | IN459 |
| A13 | SN74122N |
| A14 | HA2605 |
| A15 | HA2605 |
| A16 | HA2605 |
| A17 | HA2605 |
| A18 | SN7474N |
| A19 | SN7402N |
| A20 | SN74197N |
| A21 | SN74197N |
| A22 | SN7474N |
| A23 | SN74107N |
| A24 | SN74107N |
| A25 | SN7474N |
| A26 | SN7474N |

Figure 10:
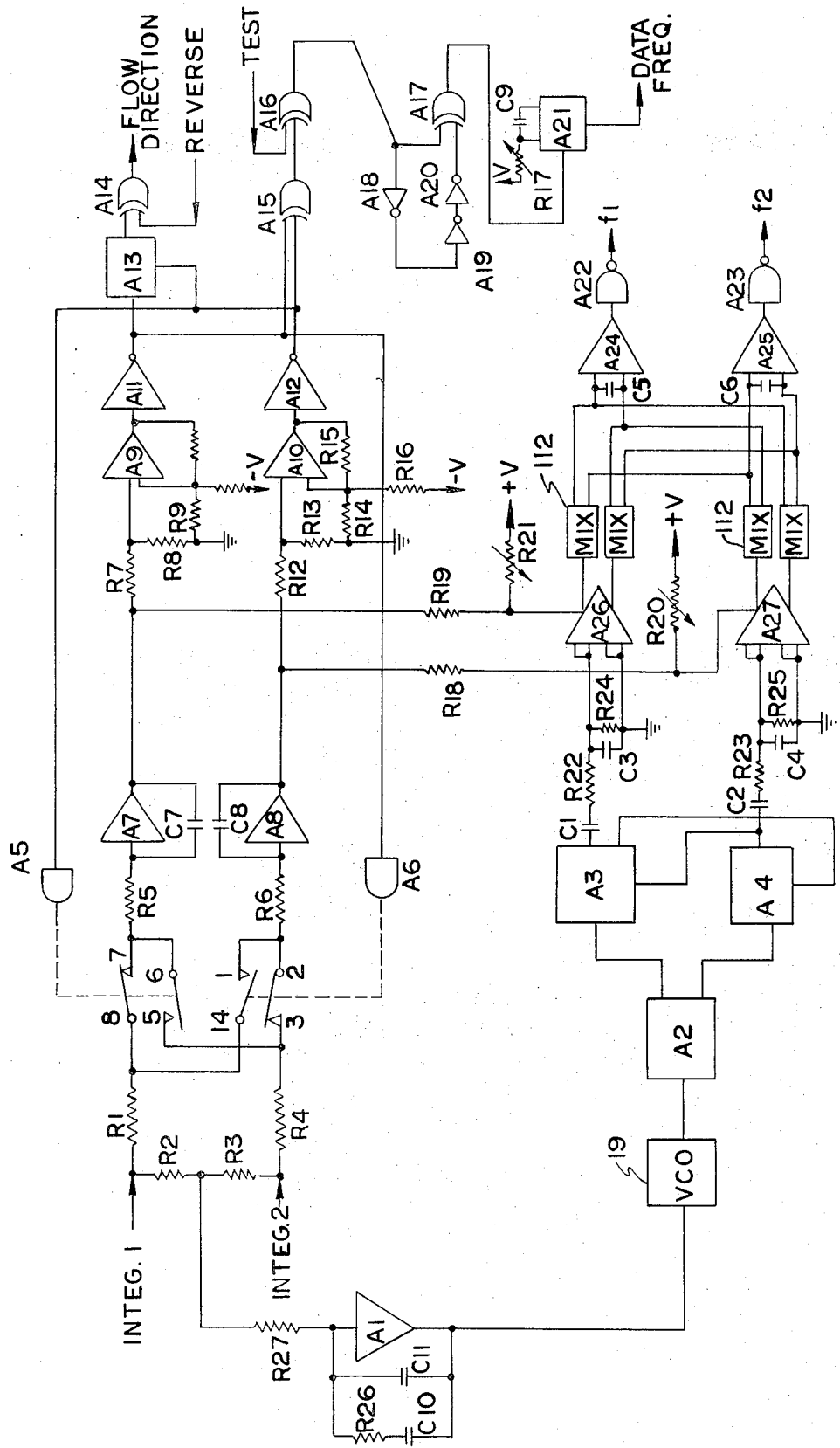
FIG. 10 is a schematic diagram of the frequency synthesis section of the system.

FIG. 10 shows a schematic of the synthesizer section 18 of the system. The downstream and upstream frequencies, $f_1$ and $f_2$ respectively, are synthesized and the signal frequencies utilized in their synthesis are found to be proportional to the sum frequency and to the difference frequency. A direction of flow indication is provided and it is necessary to use only one VCO. The various circuit components have the following values:

RESISTORS

| | | |
|---|---|---|
| R1 | Kilohms | 1 |
| R2 | " | 10 |
| R3 | " | 10 |
| R4 | Kilohms | 1 |
| R5 | " | 10 |
| R6 | " | 10 |
| R7 | " | 47 |
| R8 | " | 15 |
| R9 | " | 10 |
| R10 | " | 10 |
| R11 | " | 56 |
| R12 | " | 47 |
| R13 | " | 15 |
| R14 | " | 10 |
| R15 | " | 10 |
| R16 | " | 56 |
| R17 | " | 24.7 |
| R18 | " | 15 |
| R19 | " | 15 |
| R20 | " | 2 |
| R21 | " | 2 |
| R22 | " | 4.7 |
| R23 | " | 4.7 |
| R24 | " | 1 |
| R25 | " | 1 |
| R26 | " | 100 |

CAPACITORS

| | | |
|---|---|---|
| C1 | mf | .001 |
| C2 | " | .001 |
| C3 | pf | 470 |
| C4 | " | 470 |
| C5 | pf | 100 |
| C6 | " | 100 |
| C7 | " | 3000 |
| C8 | " | 3000 |
| C9 | " | 220 |
| C10 | mf | .1 |
| C11 | " | 1 |

SOLID STATE DEVICES

| | |
|---|---|
| A1 | HA2605 |
| A2 | SN7474N |
| A3 | SN7474N |
| A4 | SN7474N |
| A5 | DG190 |
| A6 | DG190 |
| A7 | HA2605 |
| A8 | HA2605 |
| A9 | SN72514N |
| A10 | SN72514N |
| A11 | SN7404N |
| A12 | SN7404N |
| A13 | SN7474N |
| A14 | SN7486N |
| A15 | SN7486N |
| A16 | SN7486N |
| A17 | SN7486N |
| A18 | SN7404N |
| A19 | SN7404N |
| A20 | Sn7404N |
| A21 | SN74122N |
| A22 | SN7413N |
| A23 | SN7413N |
| A24 | SN72514N |
| A25 | SN72514N |
| A26 | MC1545G |
| A27 | MC1545G |

The system just described demonstrated measuring capabilities in pipe sizes down to one-eighth inch in diameter which produced flow measurement down to 0.008 feet/sec and resolution of sound speed of one part in 5,000. The system measures bidirectionally, may be reversed, exhibits no zero flow lock-up, provides independent sound speed and flow data, contains self control alarms for loss of tracking, low received signal level and no received signal, and provides for transmit pulse echo suppression.

I claim:

1. In an ultrasonic speed of sound and flow meter system of the type utilizing first and second transducers spaced in relative upstream-downstream positions in communication with the fluid to be metered, means for generating signals to be transmitted by said transducers through said fluid, means for receiving signals sensed by said transducers, means for generating a reference signal, means for comparing the phase of the received signal and the reference signal and generating a phase dependent signal, means responsive to said phase dependent signal for generating signal levels proportional to upstream and downstream speeds of sound, means responsive to said signal levels for providing frequencies proportional to upstream and downstream speeds of sound, control means utilizing said frequencies for directing transmission alternately by said first and second transducer and reception alternately by said second and first transducer respectively, and means combining said frequencies whereby a sum frequency is obtained proportional to the speed of sound in the medium and a difference frequency is obtained proportional to the flow rate of the medium.

2. An ultrasonic speed of sound and flow meter system as in claim 1 wherein the means providing frequencies proportional to upstream and downstream speeds of sound comprise first and second voltage controlled oscillators receiving downstream and upstream transmitted signals respectively and wherein said means combining said frequencies comprise a balanced modulator, said modulator operating to provide said sum frequency proportional to speed of sound in the medium and said difference frequency indicative of flow rate.

3. An ultrasonic speed of sound and flow meter system as in claim 1 wherein said means providing frequencies proportional to upstream and downstream speeds of sound and said means combining said frequencies comprise a voltage controlled oscillator, means for controlling the output frequency of the voltage controlled oscillator utilizing said speed of sound proportional signal levels to provide said frequency indicative of sound propagation speed through the medium, means for synthesizing a data frequency utilizing said speed of sound proportional signals to provide said frequency indicative of flow rate, and means combining said oscillator and data frequencies.

4. An ultrasonic speed of sound and flow meter system as in claim 3 together with transmit signal automatic gain control responsive to the amplitude of said received signal, and voltage comparator means responsive to a predetermined amplitude transmit signal indicating a low received signal operating to generate an alarm and to block data from said oscillator and data frequencies.

5. An ultrasonic speed of sound and flow meter system as in claim 3 wherein said means for controlling the output frequency of said voltage controlled oscillator comprises a summing circuit receiving said signal levels proportional to upstream and downstream speeds of sound, an integrator responsive to the output of the summing circuit, said integrator operating into said voltage controlled oscillator whereby a change is effected at said oscillator output proportional to the integral of said summing circuit output.

6. An ultrasonic speed of sound and flow meter system as in claim 3 wherein said means for synthesizing a data frequency utilizing said speed of sound proportional signals comprises first and second integrator circuits to receive said upstream and downstream speed of sound proportional signals, first and second comparators to receive the outputs of said first and second integrators respectively, switching means to direct the upstream frequency proportional signal alternately to said first and second integrators and actuated by said second comparator, switching means to direct said downstream frequency proportional signal alternately to said first and second integrators and actuated by the output of said first comparator, and a frequency multiplier circuit to receive the outputs of said first and second comparators to provide a frequency indicative of flow.

7. An ultrasonic speed of sound and flow meter system as in claim 6 together with a bi-directional flow indication actuated by phase relationship between said first and second comparators.

8. An ultrasonic speed of sound and flow meter system as in claim 3 wherein said means combining said oscillator and data frequencies comprises a frequency divider to receive the output of said voltage controlled oscillator, a pair of output signals in quadrature from said frequency divider, first and second balanced modulators, a pair of outputs in quadrature from said means for synthesizing a data frequency, circuit means directing said leading divider frequency and said lagging data frequency to said first balanced modulator, circuit means directing said lagging divider frequency and said leading data frequency to said second balanced modulator, linear frequency mixing means to receive the outputs of said first and second balanced modulators, said mixing means operating to provide first and second frequency outputs proportional to downstream and upstream speeds of sound respectively.

9. An ultrasonic speed of sound and flow meter system as in claim 1 wherein said control means utilizing said frequencies for directing transmission alternately by said first and second transducers and reception alternately by said second and first transducers respectively comprises circuit means responsive to a predetermined number of cycles of said upstream and downstream frequencies providing an up/down control, first switching means sensitive to said up/down control to alternately direct said signals to be transmitted to said first and second transducers, second and first preamplifiers receiving said signals sensed by said second and first transducers respectively, second switching means sensitive to said up/down control to direct output alternately from said second and first preamplifiers, a trigger circuit to define the phase of said received signal, said trigger circuit output directed to said means for comparing the phase of the received signal and the reference signal.

10. An ultrasonic speed of sound and flow meter system as in claim 1 wherein said means for comparing the phase of the received signal and the reference signal and generating a phase dependent signal comprises circuitry having first and second output and providing one of said first and second outputs dependent on phase lead or lag of said received signal relative to said referer signal and wherein said means responsive to said phase dependent signal for generating signal levels proportional to upstream and downstream speeds of sound comprises circuitry for providing a signal level having a polarity determined by said one of said first and second outputs for both upstream and downstream transmissions and for integration of said signal level having a polarity separately for both upstream and downstream transmissions.

11. An ultrasonic speed of sound and flow meter system as in claim 1 wherein said means for generating signals to be transmitted by said transducers and said means for receiving the signals sensed by said transducers comprise switching means for directing said transmission signals to said first transducer, circuit means for receiving and shaping a signal transmitted generally downstream, circuit means directing said shaped signal to actuate said switching means directing the subsequent transmit pulse to said second transducer for transmission generally upstream.

12. An ultrasonic speed of sound and flow meter system as in claim 1 together with an alarm indication providing evidence of loss of system tracking when said means for comparing the phase of the received signal and the reference signal does not display a reversal within a preset period of time to said means responsive to said phase dependent signal.

13. An ultrasonic speed of sound and flow meter system as in claim 1 together with a preset repetition rate proportional to upstream and downstream speeds of sound, said repetition rate providing suppression of echoes generated within the flowing medium by prior transmission pulses.

14. In an ultrasonic speed of sound and flow meter system of the type utilizing first and second transducers spaced in relative upstream — downstream positions in communication with the fluid to be metered, means for alternately transmitting signals through the fluid from said first and second transducers respectively, means for receiving signals from the fluid in said second and first transducers respectively, means for generating a reference signal, means for comparing said reference signal with said received signals and generating a comparison signal, means responsive to said comparison signal for generating signals proportional to upstream and downstream transmission times, and means responsive to said last named signals for synthesizing frequencies proportional to said upstream and downstream transmission times, said synthesizing means forming a sum frequency and a difference frequency of said upstream and downstream transmission frequencies indicative of fluid sound propagation velocity and flow rate respectively.

15. In an ultrasonic speed of sound and flow meter system of the type utilizing first and second transducers spaced in relative upstream/downstream positions in communication with the fluid to be metered, means for alternately transmitting signals to the fluid from said first and second transducers respectively, means for receiving signals from the fluid in said second and first transducers respectively, means for generating a reference signal, and means responsive to said received and reference signals for generating frequencies proportional to the upstream and downstream speeds of sound, said frequencies combining to form a sum frequency indicative of sound propagation velocity through the fluid and a difference frequency indicative of flow rate.

16. A method of measuring fluid flow rate and velocity of sound propagation through a flowing fluid utilizing at least one pair of first and second ultrasonic energy transducers capable of functioning as transmitters and receivers in communication with the fluid which comprises generating a transmit pulse, transmitting said transmit pulse from said first transducer through said fluid in a generally downstream direction, generating a reference pulse, receiving said transmitted pulse at said second transducer, comparing the received pulse and the reference pulse in phase and generating a signal with phase dependent polarity, connecting said signal with phase dependent polarity to a first summing network, generating a first control signal in said first summing network, alternating the direction of the subsequent transmit pulse to said second transducer with said first control signal, transmitting a subsequent transmit pulse from said second transducer through said fluid in a generally upstream direction, generating a subsequent reference pulse, receiving said subsequent transmit pulse at said first transducer, comparing the subsequent received pulse and the subsequent reference pulse in phase and generating a subsequent signal with phase dependent polarity, connecting said subsequent signal with phase dependent polarity to a second summing network, generating a second control signal in said second summing network, controlling the output of a high frequency VCO with the mean value of said first and second control signals, synthesizing a data frequency responsive to said control signals, said VCO and data frequencies providing a signal frequency proportional to the speed of sound through the medium, and a signal frequency proportional to flow rate respectively.

17. A method of measuring fluid flow rate and velocity of sound propagation through the fluid utilizing at least one pair of first and second ultrasonic energy transducers capable of functioning as transmitters and receivers in communication with the fluid which comprises generating a transmit pulse, generating a reference pulse, directing the transmit pulse alternately upstream and downstream of the flowing medium, receiving the transmit pulse, comparing phase of the received and reference pulses, generating a signal dependent on said phase comparison, generating signals proportional to upstream and downstream sound speeds responsive to said signal dependent on phase, summing said proportional signals, controlling a voltage controlled oscillator with said sum, generating a data frequency utilizing said proportional signals, combining said data frequency with said oscillator frequency to synthesize upstream and downstream sound speed frequencies, generating control signals responsive to said sound speed frequencies, said control signals operating to maintain a constant time relation between all system signals for varying fluid characteristics and different size flow conduits.

18. A method of measuring fluid flow rate and velocity of propagation as in claim 17 wherein generating a signal dependent on said phase comparison and generating signals proportional to upstream and downstream sound speeds comprises directing downstream received signals to a first channel, directing upstream received signals to a second channel, generating a pulse of one polarity for received pulse phase leading reference pulse and of opposite polarity for reference pulse phase leading received pulse, delivering said pulses in said first channel to a first integrator, delivering said pulses in said second channel to a second integrator, said integrators operating to sum pulses and to provide outputs proportional to downstream and upstream sound speeds respectively.

19. A method of measuring fluid flow rate and velocity of sound propagation as in claim 17 wherein generating a data frequency utilizing said proportional signals comprises directing said signals to first and second fast integrators, connecting said first and second integrators to first and second voltage comparators, directing the output of said first voltage comparator to alternately switch the upstream and downstream proportional signals to the input of said second fast integrator, directing the output of said second comparator to alternately switch the upstream and downstream proportional signals to the input of said first fast integrator, and combining said first and second comparator outputs.

20. A method of measuring fluid flow rate and velocity of sound propagation as in claim 19 wherein combining said first and second comparator outputs comprises multiplying the frequency at said first and second comparator outputs to provide a data frequency, and providing a constant data frequency pulse charge to facilitate data reduction.

21. A method of measuring fluid flow rate and velocity of sound propagation as in claim 17 wherein combining said data frequency with said oscillator frequency comprises dividing said oscillator frequency to obtain two outputs in quadrature, directing said data frequency and said divided oscillator frequency to first and second balanced modulators, mixing the outputs of said first and second modulators to obtain a sum frequency and a difference frequency of the oscillator and data frequencies whereby the balanced modulator output frequencies are proportional to upstream and downstream speeds of sound.

* * * * *